(12) United States Patent
Adams

(10) Patent No.: US 8,693,332 B2
(45) Date of Patent: Apr. 8, 2014

(54) FLOW STATE AWARE MANAGEMENT OF QOS THROUGH DYNAMIC AGGREGATE BANDWIDTH ADJUSTMENTS

(75) Inventor: John Leonard Adams, Felixstowe (GB)

(73) Assignee: New Renaissance Technology and Intellectual Property, Burlingame, CA (US)

( * ) Notice: Subject to any disclaimer, the term of this patent is extended or adjusted under 35 U.S.C. 154(b) by 258 days.

(21) Appl. No.: 12/828,150

(22) Filed: Jun. 30, 2010

(65) Prior Publication Data

US 2010/0329118 A1 Dec. 30, 2010

Related U.S. Application Data

(60) Provisional application No. 61/221,830, filed on Jun. 30, 2009.

(51) Int. Cl.
*H04L 12/26* (2006.01)

(52) U.S. Cl.
USPC .......................................... 370/235; 370/468

(58) Field of Classification Search
None
See application file for complete search history.

(56) References Cited

U.S. PATENT DOCUMENTS

| | | | |
|---|---|---|---|
| 6,937,566 B1* | 8/2005 | Forslow ........................ | 370/231 |
| 7,269,657 B1* | 9/2007 | Alexander et al. ............ | 709/229 |
| 7,478,161 B2* | 1/2009 | Bernet et al. .................. | 709/228 |
| 7,623,458 B2* | 11/2009 | Ayyagari et al. .............. | 370/235 |
| 7,646,715 B2* | 1/2010 | Oueslati et al. ............... | 370/234 |
| 7,907,519 B2* | 3/2011 | Songhurst et al. ............ | 370/229 |
| 7,911,959 B2* | 3/2011 | Ayyagari et al. .............. | 370/235 |
| 8,000,241 B2* | 8/2011 | O'Neill ......................... | 370/235 |
| 8,023,410 B2* | 9/2011 | O'Neill ......................... | 370/235 |
| 2004/0170125 A1* | 9/2004 | O'Neill ......................... | 370/230 |
| 2005/0220014 A1* | 10/2005 | DelRegno et al. ............ | 370/230 |
| 2006/0182098 A1* | 8/2006 | Eriksson et al. .............. | 370/389 |
| 2008/0080382 A1* | 4/2008 | Dahshan et al. .............. | 370/235 |

\* cited by examiner

*Primary Examiner* — Michael J Moore, Jr.
(74) *Attorney, Agent, or Firm* — Procopio, Cory, Hargreaves & Savitch LLP

(57) ABSTRACT

A packet network node and method of operating a packet network node are disclosed. Conventional packet network nodes react to congestion in the packet network by dropping packets in a manner which is perceived by users to be indiscriminate. In embodiments of the present invention, indiscriminate packet discards are prevented by causing packets to be discarded on lower priority flows and flow aggregates. A further action is taken to reduce the likelihood of packet discards. When an aggregate set of flows raises a congestion alarm action is taken to try to increase the capacity of the aggregate through taking capacity from pre-assigned donor aggregates. A donor aggregate may be carrying flows, for example flows classified as best effort. Another type of donor capacity is donor re-assignable unused capacity. Aggregates may have capacity added either up to a defined limit or, temporarily, exceeding any limit provided there is free capacity available, but removable back to the defined limit when other aggregates need increased capacity and are below their defined limits.

18 Claims, 10 Drawing Sheets

Main sub-functions of function 6

Figure 1: FSA signalling procedure for each service context

Figure 2: Out-of-band signalling combined with flow-based QoS

Figure 3: Network configuration

Figure 4: Example deployment of a dynamic aggregate bandwidth manager

Figure 5: Main sub-functions of function 6

Figure 6: Expansion of function 6.2

Figure 7: Expansion of function 6.3

Figure 8: Expansion of function 6.3.1

Figure 9: Another embodiment with additional API function 6.5

FLOW STATE AWARE MANAGEMENT OF QOS THROUGH DYNAMIC AGGREGATE BANDWIDTH ADJUSTMENTS

CROSS-REFERENCE TO RELATED APPLICATIONS

This regular U.S. patent application relies on and claims the benefit of priority under 35 U.S.C. 119(e) from U.S. provisional patent application No. 61/221,830, the entire disclosure of which is incorporated by reference herein.

BACKGROUND OF THE INVENTION

1. Field of the Invention

The present invention relates to a communications network and a method of operating a communications network.

2. Description of the Related Art

Recently, the demand for streaming video to a computer via the Internet has grown strongly. This has led to a need to supply increasing amounts of video material over local communication networks (including the copper pairs used by telephone network operators or the coaxial cables used by cable television network operators).

In telephony networks this additional demand is being met partly by the introduction of Digital Subscriber Loop (DSL) technology. As its name suggests, this technology carries digital signals over the local copper loop between a user's home and a local telephone exchange. Data-rates of several megabits per second to the user's home have become commonplace. Advances in this technology now lead to much higher rates, 20 Mbit/s and above and with plans in the industry to offer 50 Mbit/s and above to a substantial proportion of broadband end users in the relatively near future. Using DSL, the digital signal is conveyed between modems placed at either end of the copper loop. The advantages of statistical multiplexing have led to the digital signals being organized into transport packets (whether they be Asynchronous Transfer Mode (ATM) packets or Ethernet packets. Over either of these are carried Internet Protocol (IP) packets conveying all of the broadband services.

Cable networks have also been upgraded to carry broadband services to user's homes. Substantial numbers of users currently receive broadband services over cable and, again, the services are conveyed using IP packets over Ethernet.

Video material requires a data rate which varies between 1.5 Mbps (for a quality comparable to that offered by a video cassette recording) to 20 Mbps (High-Definition Television). In DSL or cable networks, these higher application data rates means that a mechanism is needed to manage contention for the capacity available towards the user's home. This capacity management includes both the maximum available capacity for any one user and the shared capacity towards the DSL Access Multiplexer (DSLAM) or Cable Modem Termination System (CMTS). This capacity (sometimes termed "backhaul" capacity) may be shared by several hundred users, and contention for the capacity will also need to be managed as users demand more choice in the material they view.

The backhaul capacity may be divided into VLANs, where each VLAN is the aggregate bandwidth that a single internet service provider can exploit to deliver services to many end-users. In this case, the active users who are receiving internet services via this service provider will share the capacity of this VLAN aggregate. In an alternative arrangement, several internet service providers may jointly share the backhaul capacity and some means may be provided so that each service provider obtains a fair share.

Under the first arrangement, where the capacity of a VLAN is available to a single service provider, there is freedom for that service provider to make unique choices about cost and QoS. The choice is a balance between insufficient capacity would result in frequent congestion and more dissatisfaction among the end users. Too much capacity results in excess cost for the provision of services.

Under the second arrangement, where several service providers share capacity, there may be more opportunity to exploit unused capacity that belongs to one of the fair shares. This has advantages but also some disadvantages. The advantage is that the cost of aggregate bandwidth may be kept lower for each of the service providers. Instead they may rely on the availability of unused bandwidth when otherwise there would have been dissatisfaction among their end users due to congestion. The disadvantage is that the availability of extra bandwidth is uncertain, being dependent on the patterns of usage of end users of each of the sharing service providers. Another disadvantage is the non-uniqueness of the cost/QoS offering of each of the service providers. However, this disadvantage can be overcome by altering the nature of the fair-share controls of the aggregate bandwidth, so that one service provider is preferred over another in terms of the amount of capacity its users are entitled to get when loading levels are high.

An arrangement where capacity is shared among several service providers and the capacity is unequally divided among them when loading levels are high can lead to even greater uncertainty that extra capacity is there when needed, especially for those service providers that receive a lower amount of capacity that the average.

It is the management of this issue to remove the uncertainty that extra bandwidth is there when needed and to provide just enough bandwidth, on backhaul links or other network links, that is the subject of the present patent.

In a conventional circuit-switched telephone network, the problem of contention for scarce telecommunication resources is dealt with by simply preventing a user from receiving (or sending) any traffic unless the necessary capacity to carry that traffic can be reserved beforehand. The capabilities of multi-services packet networks have also been developed to include call admission control schemes—examples include the Resource Reservation Protocol (RSVP). Although such schemes can prevent congestion when all new communications or calls are admitted or rejected using these principles, QoS management must also manage so-called "elastic" traffic where there is potentially a need for a minimum guaranteed rate but frequently a desire to transmit the flow as fast as possible, subject to network congestion constraints and constraints on maximum sending rates.

An alternative to the use of connection admission control in packet networks is to use reactive flow control. These schemes allow users access to communications resources but attempt to cause senders to decrease their sending rate on the onset of congestion. The scheme used for reliable transmission across the Internet (Transmission Control Protocol) is the most common example. This is unsuitable for video flows however, since real-time video servers cannot reduce their sending rate.

Most flow control schemes, applied to elastic applications, result in some reduction of the rate available at the onset of congestion. Some flow control schemes are more sophisticated, classifying traffic into different classes, with some classes being more likely to suffer packet delay or discard than others. In situations where such classification is not available or where most traffic is within one class, alternative solutions must be provided. One such alternative solution which concentrates the adverse effects of ATM cell discard on one IP packet at a time is described in 'Early Selective Packet Discard for Alternating Resource Access of TCP over ATM-UBR' by Kangsik Cheon and Shivendra S. Panwar, in the Proceedings of IEEE Conference on Local Computer Networks LCN 97, Minneapolis, Minn., Nov. 2-5, 1997, incorporated by reference herein.

A discussion toward the Internet based Next Generation Network (NGN) is actively progressed around the standards bodies including the ITU-T (International Telecommunication Union-Telecommunication Standardization Sector) and ETSI (European Telecommunications Standards Institute), IEEE (Institute of Electrical and Electronics Engineers), IETF (Internet Engineering Task Force), and etc. The roles of the standard bodies are different. The IEEE and IETF develop the core technology for specific problems in layer 2 and layer 3, respectively. ITU-T and ETSI develop the network architecture and control procedure.

A QoS control or resource control architecture has been developed in the several standard bodies. To name a few, they are ITU-T, ETSI, CableLab, 3GPP, MSF, and the DSL forum. Among those organization, CableLab, and DSL forum, 3GPP, and ETSI define the QoS control architecture in a particular case while ITU-T defines the generic architecture that can cover the outcomes of other standard bodies.

CableLab defines the dynamic QoS (DQoS) control architecture as described in PacketCable Specification "PacketCable Dynamic Quality-of-Service" for the Hybrid Fiber and Coaxial (HFC) network. The control architecture is designed for the uniqueness of the HFC network. In the HFC network, multiple CMs (Cable Modems) share an upstream channel to CMTS (Cable Modem Termination System). The bandwidth is controlled based on layer 2 MAC protocol called DOCSIS (Data Over Cable System Interface Specification) as described in "Data-Over-Cable Service Interface Specifications, Radio Frequency Interface Specification", by Cable Television Laboratories, Inc., Jul. 30, 2003. The layer 2 level QoS guarantee mechanism is defined from the DOCSIS version 1.1. The goal of the DQoS is supporting the QoS guaranteed service through HFC network.

DQoS defines the procedure of the call setup signaling and the dynamic QoS control on DOCSIS interface. In the architecture, the CMS (Call Management Server)/Gate controller controls the call establishment. The guaranteed bandwidth between CM and CMTS is reserved dynamically during the call setup signaling. The CMS/Gate Controller triggers the layer 2 or layer 3 QoS signaling to reserve the bandwidth in the HFC network by sending commands to CM, CMS, or MTA (Multimedia Terminal Adapter).

DQoS has been refined through version 1.0, 1.5, and 2.0. Version 1.0 defines the basic call setup signaling procedure for both embedded MTA and standalone MTA. The embedded MTA can initiate the dynamic layer 2 QoS signaling while a standalone MTA initiates IP level QoS signaling. Version 1.5 and 2.0 defines the QoS control architecture when SIP (Session Initiation Protocol) based call setup signaling is used. DQoS 2.0 is defined especially for interoperability with IP Multimedia Subsystem (IMS) which is the SIP based call setup architecture developed in 3rd Generation Partnership Project (3GPP). PacketCable Multimedia, as described in PacketCable Specification "Multimedia Specification", Dec. 21, 2005, has been developed for simple and reliable control for the multimedia service over cable network. It defines the service delivery framework for the policy based control on multimedia service. The simple procedure for time or volume based resource authorization, resource auditing mechanism, and security of the infrastructure are defined in PacketCable Multimedia.

Such developments as this strongly suggest that new QoS mechanisms should take account of, and build on top of, the underlying deployment of QoS controls.

Again, the DSL forum defines the resource control at the DSL (Digital Subscriber Line) access network, as described in Technical Report 59 DSL Forum "DSL Evolution—Architecture Requirements for the Support of QoS-Enabled IP Services". Unlike Cable network, DSL modem is connected to the subscriber through the dedicated line. Layer 2 level dynamic QoS control between DSL modem and Digital Subscriber Line Access Multiplexer (DSLAM) is not required. The DSL forum focuses more on resource control in the home network especially resource control of multiple terminals behind the home gateway.

The resource control architectures defined in the above mentioned two standard bodies—PacketCable and DSL Forum focus on a specific transport technology (i.e., HFC network and DSL network). The scope of DQoS and DSL forum is mainly within network operator's view. Unlike these, RACF (Resource and Admission Control Functions), as described in ITU-T recommendation Y.2111 "Resource and Admission Control Functions in NGN", and RACS (Resource and Admission Control Sub-system), as described in ETSI ES 282 003 V1.1.1 (2006-03), "Resource and Admission Control Sub-system (RACS); Functional Architecture", define the resource control architecture in more general aspect.

The QoS control architecture in both RACF and RACS are closely related with 3GPP (3rd Generation Partnership Project) effort. The 3GPP is originally founded for developing new service architecture over cellular network, especially for GSM (Global System for Mobile communication) network. During this effort, 3GPP developed the IMS (IP Multimedia Subsystem) for controlling the IP multimedia services in the areas of session control, service control, and management of database of the subscribers. Even though IMS is initially developed for the evolution of GSM cellular network, its framework can be applicable for any types of transport technologies. The IMS architecture has been adopted to the other QoS control architectures such as 3GPP2 MMD (Multimedia Domain), ETSI TISPAN (Telecoms & Internet converged Services & Protocols for Advanced Networks), and ITU-T NGN. Thus, both RACS and RACF are interoperable with IMS.

In general, RACF and RACS are very similar with each other. The two standards bodies are closely interacted in developing their architecture. There is no significant conflict between the two, but there are still differences, as described in ITU-T NGN-GSI Contribution, "Comparison of TISPAN RACS and ITU-T RACF". One of differences is the range of the control region. The control region of RACS covers the access network and the edge of the core network. The access network is defined as the region where the traffic is aggregated or distributed without dynamic routing. The resource control in the access network is done in layer 2 level. The core network is the region that the IP routing starts. The core network is out of scope in the RACS. RACF, however, covers both core and access network. RACF covers both fixed and mobile networks while RACS is defined for the fixed network. For the control mechanism, the RACF defines more control scenarios than RACS. Therefore, RACS is considered as a subset of RACF.

ITU-T defines QoS control functions based on its NGN architecture. One of the important concepts in the ITU-T NGN architecture is the independence of the transport and the service, as described in ITU-T recommendation Y.2012 "Functional Requirements and Architecture of the NGN". The transport is concerning about the delivery of packets of any kind generically, while the services are concerns about the packet payloads, which may be part of the user, control, or management plane. In this design principle, the NGN architecture is divided into two stratums—Service Stratum and Transport Stratum. Under the concept of the independence of a service and transport functions, the network resource and reliability are guaranteed by the network side upon request from the service stratum. Service Stratum is responsible for the application signaling and Transport Stratum is responsible for reliable data packet forwarding and traffic control. The service stratum can be a simple application server or a full-blown system such as IMS (IP Multimedia Sub-system).

Transport control function is located in Transport stratum interfacing with the Service stratum. It determines the admission of the requested service based on the network policy and the resource availability. It also controls the network element to allocate the resource once it is accepted. Resource and Admission Control Functions (RACF) is responsible for the major part of the admission decision and resource control of the transport function. Details of RACF mechanism can be found in "Overview of ITU-T NGN QoS control", by Jongtae Song, Mi Young Chang, Soon Seok Lee, and Jinoo Joung, IEEE Communication Magazine, Vol. 45, No. 9, September 2007 and ITU-T recommendation Y.2111 "Resource and Admission Control Functions in NGN", incorporated by reference herein.

This developing infrastructure needs to be taken account of when considering new QoS mechanisms.

Review of current per-flow QoS controls Flow level transport technology is not a new concept. The core technologies for traffic management schemes such as flow level scheduling, policing, and sharing are already available in a commercial product, as described in "Flow based control for Future Internet" by Jongtae Song, presented in Future Internet Forum (FIW) in July 2007, incorporated by reference herein. The current deployment of flow base control, however, is limited only at the edge of the network. Typical examples of flow base control are traffic monitoring and packet inspection, PacketCable access, session border controller, edge router, and interworking between two networks. They are mostly stand alone solution at the edge of the network.

However, flow level traffic control only at the edge cannot guarantee the flow level QoS. Furthermore, DiffServ guarantees the QoS only if the premium traffic load is very low (~under 10%), as described in "Providing guaranteed services without per flow management" by I. Stoika and H. Zhang in CM SIGCOMM, September 1999, pp. 91-94, incorporated by reference herein. On the other hand, having scalable control architecture for flow level traffic control along the data path is a challenging issue, because the number of flows in a network is huge.

There are several schemes proposed for the scalable control of traffic using flow level mechanisms. These are listed below.

(1). Flow Aware Network (FAN) France Telecom proposed a Flow Aware Network (FAN), as described in "A new direction for quality of service: Flow-aware networking" by S. Oueslati and J. Roberts in Proc. Conference on Next Generation Internet Network (NGI), April 2005, incorporated by reference herein. FAN applies three different regimes based on the network status. They are the "transparent regime", "elastic regime", and "overload regime". The transparent regime is applied when the network has no congestion at all. The elastic regime is applied when the network experiences the occasional traffic congestion because of a few high rate data flows. The overload regime is applied when the traffic overloads the link capacity in the network.

No traffic control is required in the transparent regime. The traffic control is effective only in the overload or elastic regime. In the elastic regime, the network enforces the bandwidth limit for every flow. Every flow is assigned the same amount of bandwidth. In the overload regime, new flows are blocked to protect existing flows. To reduce the control complexity, an implicit approach is preferred where no signaling is required for controlling the network. Each node makes locally optimal decision based on local observation.

The main focus of FAN is the simplicity. It requires no signaling. Only implicit admission control is required upon congestion. Although the control mechanism is very simple, it is shown that the network is stabilized remarkably in FAN. However, this architecture is designed mainly for network stabilization aspect. Every flow is treated equally. In order to support various of QoS requirement for individual flow, this architecture should be improved.

(2). Flow Sate Aware (FSA) technologies FSA is developed to provide different QoS for the individual flow. FSA defines the service types based on typical example of Internet services, as described in ITU-T Recommendation Y.2121, "Requirements for the support of stateful flow-aware transport technology in an NGN" and "Changing the internet to support real-time content supply from a large fraction of broadband residential users" by J. L. Adams, L. G. Roberts, and A. I. Jsselmuiden, BT Technology Journal, Vol. 23, No. 2, pp 217-231, April 2005, incorporated by reference herein. They are Maximum Rate (MR), Guaranteed Rate (GR), Variable Rate (VR), and Available Rate (AR). GR is designed for applications requiring guaranteed bandwidth for the entire duration of the flow. MR is designed for streaming media such as video and voice. AR is designed for data traffic flow where the application can setup the flow rate at the maximum rate that the network can currently support. VR is the combination of AR and MR. VR could be used for obtaining a maximum response time for a transaction (e.g., a stock trade with maximum transaction time). The MR portion guarantees the minimum guaranteed bandwidth and AR portion is for use available network resource. FSA divides the network resource into two portions. One is Fixed Rate (FR) and the other is Network Rate (NR). FR is requested when flow needs a fixed rate available during the service. NR is requested when flow sends buffered data using network available bandwidth. Service type GR and MR request FR, AR requests NR, and VR requests both NR and FR. The detail requirement is defined in ITU-T Recommendation Y.2121, "Requirements for the support of stateful flow-aware transport technology in an NGN".

FR and NR are requested by the signaling, as described in ITU-T Study Group 11, Draft Recommendation Q.flow-statesig on signaling protocols and procedures relating to Flow State Aware access QoS control in an NGN, Editor J. L. Adams, incorporated by reference herein, and every node along the path configures its resource based on the requested FR and NR. For the call setup signaling, the source node and destination node exchanges the control messages. [FIG. 1] describes the signaling procedure for the service type MR, GR, and AR. In the ingress FSA (iFSA) and egress FSA (eFSA) exchanges the request, response, confirm, renegotiate, and confirm message for request the transport resource. For MR, iFSA sends the data traffic before receiving the response from eFSA. MR is designed based on the concept of the conditional guaranteed bandwidth, as described in "Changing the internet to support real-time content supply from a large fraction of broadband residential users" by J. L. Adams, L. G. Roberts, and A. I. Jsselmuiden, BT Technology Journal, Vol. 23, No. 2, pp 217-231, April 2005, and ITU-T Recommendation Y.1221 Amendment 2 (2005), Traffic control and congestion control in IP-based networks, incorporated by reference herein. For GR, it needs to know the explicit start and ending time of the flow. Therefore, it sends confirm and close messages for acknowledging every transit node reserves and release the requested bandwidth. The service type AR is designed to use network available resource. iFSA and other FSA nodes continuously monitor the network available resource and adjust the NR accordingly.

Both approaches, FAN and FAS, give an insight for flow based traffic control. FAN shows that even very simple flow level traffic control can stabilize the network efficiently. FSA shows that the network resource can be divided into FR and NR. It also indicates that the transit nodes should be controlled for end-to-end flow level QoS.

However, the two approaches have outstanding issues. As mentioned earlier, FAN is not designed for supporting various QoS requirement of the service. Its main objective is stabilizing the overall network performance. In this viewpoint, FAN treats every flow equally. This may stabilize the transport network in general, but the network provider cannot generate additional profit, because FAN cannot support the service that has special QoS treatment. Good business model is hardly found in this case.

FSA is designed for supporting various QoS requirement. Its implementation can be done in both the in-band signaling, as described in ITU-T Study Group 11, Draft Recommendation Q.flowstatesig on signaling protocols and procedures relating to Flow State Aware access QoS control in an NGN, and out-of-band signaling. The in-band signaling procedure requires the every node exchanges the request and response. The request need to be examined by the all the transit node. The destination node generates the response message, and source node finds the agreed rate from the response message. In this approach every FSA node should maintain the flow state.

Requiring FSA signaling feature in every user terminal is possible. However, by making the terminal independent of FSA, we can have several benefits. First, the terminal usually has different capability. The network architecture should be flexible enough to support multiple types of terminal in a network. The terminal can support transport QoS signaling but also has application signaling. The application signaling is common for all terminal types. In order to support more terminal types, the QoS signaling of terminal should be designed in application level. Second, the network security is important in managed network. Enabling the signaling function in the terminal may cause the security hole in the network. For resolving this problem, ITU-T Recommendation Y.2121, "Requirements for the support of stateful flow-aware transport technology in an NGN" specifies the mechanism to authorize the in-band signaling in the application signaling phase. FSA signaling initiated in the network side from the network edge can be another option to avoid the security problem.

In both FAN and FSA approaches, focus is mainly in the transport control. In order to take account of the existing deployment of QoS functions, the concept of RACF function needs to be considered.

(3). FSA with out-band signaling In this proposal, the FSA signaling is combined with RACF. CPE (Customer Premises Equipment) or user terminal should be able to request the flow level resource in any kind of application signaling. In this aspect, the CPE and user terminal should be protocol independent.

Second, this proposal focuses flow-based control in the access network, not the core. In the access network, user data traffic is statically routed to the edge of the core network, and the downstream data traffic is statically forwarded from the edge of the core network to the end user. Core supports both IP based dynamic routing and layer 2 based static forwarding. The traffic volume, number of flows, and dynamicity of traffic are different in the core and access. Traditional access network controls the bandwidth based on subscribed bandwidth per user in L2 level. For flow level traffic control, however, the bandwidth should be controlled by individual flow. Flow awareness capability is required in the access nodes. The static packet forwarding and scheduling in the flow level granularity is required in the access network. The call by call traffic control and policy enforcement from control plane (e.g., RACF) should be done in micro flow level. In the core, the number of flows is high and call by call flow level control in RACF is difficult to achieve. In the core side network, therefore, the traffic should be controlled in aggregate level rather than micro flow level. The reliability and monitoring capability will be more important in the core. The flow based traffic control and the aggregated traffic control should be translated at the edge of the core network.

These design principles are further illustrated in FIG. 2.

However, none of the above proposals provides a method of managing contention in a packet network which allows flow-based QoS mechanisms to operate without end-user signaling and support:

Preference priority control of some flows in the event of congestion or sudden re-routing of traffic in the event of a network link failure.

Admission of variable rate, delay-sensitive flows requiring some minimum guaranteed bandwidth.

Management of the fastest transfer time (highest available transfer rate).

In 'Flow State Aware QoS Management Without User Signaling', U.S. Provisional Application No. 61/118,964 filed Dec. 1, 2008, and 'Flow State Aware QoS Aggregate Management Without User Signaling', U.S. Provisional Application No. 61/185,843 filed Jun. 10, 2009, solutions are described that do not require signaling. Both solutions assume a fixed assignment of capacity is provided to each aggregate VLAN. Solution in U.S. Provisional Application No. 61/118,964 filed Dec. 1, 2008 gives every flow either a guaranteed rate or some assignment of a minimum rate and some assignment of the remaining unused capacity which is adjusted according to the number of flows and the preference priority of a flow. Solution in U.S. Provisional Application No. 61/185,843 filed Jun. 10, 2009 does not assign capacity to a single flow and does not discard any packets of any flows until the fixed capacity of an aggregate is nearing congestion. It causes less packet deletions than U.S. Provisional Application No. 61/118,964 filed Dec. 1, 2008, although, if there is evolution towards some use of signaling for some of the services and for some of the flows, U.S. Provisional Application No. 61/185,843 filed Jun. 10, 2009 is potentially more unfair on those flows that are being policed through signaling while other flows, established without signaling, are free to change their rates arbitrarily. In this case, U.S. Provisional Application No. 61/118,964 filed Dec. 1, 2008 is believed to provide a fairer arrangement. The aforesaid patent applications are incorporated by reference herein.

However, both solutions in U.S. Provisional Application No. 61/118,964 filed Dec. 1, 2008 and U.S. Provisional Application No. 61/185,843 filed Jun. 10, 2009 assume the aggregate VLAN capacities are constant. The choice of the capacity is important to the service provider. There is a need to avoid congestion becoming too frequent. However, there may be uncertainty about the traffic load, especially with the take-up of new applications among the end users. Therefore, it is typical for the service provider to provide excess capacity to ensure congestion is infrequent. But, as application data rates continue to increase, this approach of always having excess capacity becomes more and more costly for the service provider and, potentially, more costly for the user.

Thus, novel methods of operating a communications network are needed.

SUMMARY OF THE INVENTION

The inventive methodology is directed to methods and systems that substantially obviate one or more of the above and other problems associated with conventional techniques for operating a communications network.

Various embodiments of the present invention overcomes the above-mentioned difficulties, allowing service providers to exploit both:
  flow state aware QoS; and
  the rapid adjustment of VLAN capacity as needed.

This achieves the significant reduction of both the duration and frequency of incidents of congestion at minimum cost in terms of capacity deployed.

According to the present invention, there is provided a method of operating a packet subnet that aims to solve the problem of managing contention in a packet network allowing:
  Preference priority control of some flows in the event of congestion or sudden re-routing of traffic in the event of a network link failure.
  Dynamic adjustments of bandwidth in the event of congestion or sudden re-routing of traffic in the event of a network link failure, or dynamic adjustments of bandwidth in the event of one or more flow-based or aggregate flow-based measurements that are indicative of a change of bandwidth on one or more aggregates to meet QoS or cost objectives these features to be realized in an environment where there may, or may not, be FSA signaling and where RACF may or may not be deployed.

According to a first aspect of the embodiments of the present invention, the said method of operating the subnet comprises:
  The partitioning of one or more physical links into a number of aggregates, where each aggregate is assigned an amount of capacity and one or several aggregates are assigned to one or more donor aggregates co-existing on the same said link or links as the said assigned aggregates, so that any one of the said aggregates may increase its capacity by borrowing capacity from one or more of its said donor aggregates, or may decrease its capacity by giving back capacity to one or more of the said donor aggregates.
  Receiving one or more communication packets indicative of the commencement of a packet communication through said subnet, said packet communication comprising a flow consisting of a plurality of packets.
  Responsive to recognition of the commencement of a new packet flow, storing a flow identifier, enabling identification of packets belonging to said commenced packet communication flow and associating that flow identifier with one or more of the said aggregates, including or excluding the said donor aggregates.
  Responsive to recognition of the commencement of said new flow, retrieving policy information relating to any initial or sustained QoS treatment of the flow, where such policy information is derived from:
    packet header information at any level of encapsulation;
    signaling information related to that flow identity;
    policy attributes associated with the physical link on which the packet arrived or will depart;
    measured rates applying to the flow rate of the said flow, or the measured jitter in flow rate; and
    measured rates applying to the total traffic on one or more of the said aggregates which the said new flow is associated with, or the measured jitter in such said rates.
  Responsive to recognition of the commencement of said new flow, and to retrieved policy information, determining an initial or sustained discard probability from both:
    the associated stored policy information corresponding to the said new flow.
    packet counters, byte counters, or rate counters of any aggregate group of flows to which this flow belongs that are being monitored with respect to one or more traffic load criteria.
  Responsive to the said policy determination, and QoS treatment determination, related to flow identity, retrieving said policy determination and QoS treatment determination associated with the flow of the latest arriving packet, and determining if one or several pre-determined thresholds or limits have been reached, or will be reached if the latest arriving packet is transmitted, that provide indications of a change in the capacity requirements of aggregates associated with the flow of this said latest arriving packet, said pre-determined thresholds being based on, but not limited to:
    Flow rate or jitter in rate measured on any flow;
    Flow rate or jitter in flow rate measured on any aggregate;
    Flow count in any aggregates;
    Flow discard probability on the flow of the latest arriving packet;
    Policy information on any aggregates associated with the flow of the latest arriving packet;
    Packet discard measurements on any aggregate;
    Packet discard measurements on any flow;
    Packet delay measurements on any flow or averaged on any aggregate;
    Received signaling related to any flow, or received signaling related to any aggregate.
  Responsive to said determination that one or more pre-determined thresholds or limits have been reached on a said aggregate associated with the flow of the latest arriving packet, causing an indication to be observable that an increase or decrease in capacity is required for that aggregate and a corresponding decrease or increase of capacity is required of one or more donor aggregates associated with that aggregate.
  Enabling the immediate transfer of the said latest arriving packet subject only to the said determination of the discard probability associated with the flow identity of the said packet.

According to this first aspect of the embodiments of the present invention, allowing the said pre-determined limits or thresholds indicative of a change in bandwidth requirement on one or more aggregates associated with the flow identity of the said latest arriving packet to include:
  Measurements of rates or jitter in rates associated with a group of flows which may or may not include the said flow of the latest arriving packet, and where this said group of flows is a subset of all the active flows of one or more of the said aggregates associated with the said flow identity of the said latest arriving packet;

A preference priority associated with the flow identity of the said latest arriving packet, derived by the said policy determination and the said QoS treatment determination or through the said signaling received about the said flow.

According to this first aspect of the embodiments of the present invention, optionally a method where the said observable indication that a change in aggregate capacity is required on one or more aggregates includes the sending of an indication towards a verification function that determines if the said indicated change in capacity can be permitted or modified.

According to this first aspect of the embodiments of the present invention, optionally a method where the said verification function reduces the capacity of a donor aggregate by sending an indication towards a policing function that lowers the policing thresholds on rate or rate jitter of said donor aggregate such that, when said lowered policing thresholds are determined to be exceeded by measurement of the latest and recent arriving packets of the total traffic of said donor aggregate, a number of packets are discarded instead of being transmitted so that the remaining transmitted packets do not exceed the lowered policing rates.

According to this first aspect of the embodiments of the present invention, optionally a method where the said verification function, having observed said indication for an increase in capacity on an aggregate, optionally determines for this said aggregate which donor aggregates associated with the said aggregate shall be decreased in capacity and by what amount of capacity. Similarly, where the verification function observed a said indication for a decrease in capacity of the said aggregate, which donor aggregates associated with the said aggregate shall be increased in capacity and by what amount of capacity.

According to this first aspect of the embodiments of the present invention, optionally a method where a donor aggregate has no flows and its capacity is an unused pool of capacity that can be used to increase the capacity of other aggregates and its capacity can be increased by the release of capacity from other aggregates.

According to this first aspect of the embodiments of the present invention, optionally a method where the said unused pool of capacity is shared among several other flow aggregates and the said verification function controls the sharing of its pool of capacity such that:

The said verification function allows temporary use of any spare capacity in the unused capacity pool for any aggregate indicating that an increase in capacity is required on the basis of temporary or unguaranteed assignments above a pre-determined share of the said pool of capacity.

The said verification function decreases said temporary use of spare capacity when other aggregates require an increase in capacity and one or more aggregates are currently using more than a pre-determined share of the pool of capacity, such that no aggregate is decreased in capacity below its said pre-determined share unless it indicates that a further decrease is required.

According to this first aspect of the embodiments of the present invention, optionally a method where the said unused pool of capacity is shared among several other flow aggregates and the said verification function controls the sharing of its pool of capacity such that:

The said verification function allows guaranteed assignments of additional capacity for any aggregate indicating that an increase in capacity is required on the basis of guaranteed assignments up to a pre-determined share of the said pool of capacity.

The said verification function decreases capacity of any aggregate requiring guaranteed assignments of capacity only when:

Under normal operating conditions the said aggregate requiring guaranteed assignments of capacity indicates to the verification function that a decrease in capacity should be effected;

Under abnormal operating conditions where current levels of guaranteed capacity cannot be sustained.

According to this first aspect of the embodiments of the present invention, optionally a method where the said determination of an initial or sustained discard probability associated with a flow identity includes the assignment of a larger discard probability when, for any aggregate associated with the said flow identity, being an aggregate that has a portion of its capacity assigned on the basis of the said temporary assignment of capacity, the measured rate of that aggregate is greater than one or more threshold rates based on the said pre-determined share of capacity available to that aggregate.

According to this first aspect of the embodiments of the present invention, optionally a method where, when a packet arrives whose flow is associated with an aggregate where congestion has ceased or where traffic levels on an aggregate have fallen below some threshold indicative of the onset of congestion, or when measurements relating to any rate-based, byte count-based, or packet-count based threshold shows that measured levels are now below level(s) that had previously exceeded one or more such thresholds, then retrieving policy relating to such a change of status of this aggregate and relating to re-grading of the discard probability of the said flow, given that measured levels have fallen or congestion has disappeared.

According to a second aspect of the embodiments of the present invention there is provided a packet network node comprising:

an input for receiving one or more packets;

means arranged in operation to measure a packet rate or byte rate in said packet network node, relating to any flow or group of flows, and means to detect an excessive packet rate or byte rate, including the use of any associated limits of rate or rate jitter assigned to such a flow or group of flows;

means to re-assign capacity and any associated rate limits or rate jitter limits between either of the following:

one group of flows and one or more other groups of flows, referred to here as donor groups, that have a common route and share capacity, or have a partition of the capacity, of a link or a number of consecutive links over which the first said group is routed;

one group of flows and a combination of additional other said donor groups of flows (if any) and unused re-assignable capacity, referred to here as donor re-assignable unused capacity on a shared common route that the said first group, said donor groups (if any) and said donor re-assignable capacity share.

means arranged in operation to detect excessive packet bursts or jitter in the packet or byte rate in said packet network node relating to any flow or group of flows including the use of associated limits of burstiness or jitter assigned to such a flow or group of flows;

means arranged in operation to retrieve policy determination and QoS treatment determination associated with the flow of the latest arriving packet, and means arranged in operation to determine if one or several pre-determined thresholds or limits have been reached, or will be reached if the latest arriving packet is transmitted, that provide indications of a change in the capacity requirements of groups of flows associated with the flow of this said latest arriving packet, said pre-determined thresholds being based on, but not limited to:

Flow rate or jitter in rate measured on any flow;

Flow rate or jitter in flow rate measured on any group of flows;

Flow count in any groups of flows;

Flow discard probability on the flow of the latest arriving packet;

Policy information on any groups of flows associated with the flow of the latest arriving packet;

Packet discard measurements on any group of flows;

Packet discard measurements on any flow;

Packet delay measurements on any flow or averaged on any group of flows;

Received signaling related to any flow, or received signaling related to any group of flows.

According to this second aspect of the embodiments of the present invention, the packet network includes further means arranged in operation to provide an observable indication of a requirement for a capacity reassignment to any group of flows, which is either:

an observable indication that an increase in capacity is required for a group of flows and a corresponding decrease of capacity is required of zero or more said donor groups and zero or more said donor re-assignable capacity associated with that first said group.

an observable indication that an decrease in capacity is required for a group of flows and a corresponding increase of capacity is required of zero or more said donor groups and zero or more said donor re-assignable capacity associated with that first said group.

According to this second aspect of the present invention, the packet network includes further optional means arranged in operation to provide a communication identifier store for storing a set of communication identifiers and associated state information.

According to this second aspect of the embodiments of the present invention, the packet network includes further means arranged in operation to reduce or increase the discard probability associated with a flow and its related communication identifier from said communication identifier store when one or more predetermined conditions are met associated with measurements in any aggregate to which the flow belongs.

According to this second aspect of the embodiments of the present invention, the packet network includes further means arranged in operation to identify one or more flows that should be discarded when the packet rate, byte rate or the jitter of a rate in any group of flows determine that such a deletion is required.

According to this second aspect of the embodiments of the present invention, the packet network includes further means arranged in operation, on the detection that a packet rate, byte rate or the jitter of a rate in any group of flows is equal to or has exceeded a pre-determined threshold, to identify arriving packets associated with one of said communication identifiers stored in said communication identifier store; and forward packets associated with any flow identifier unless the discard probability associated with that flow identifier is set so that all packets are to be temporarily discarded.

According to this second aspect of the embodiments of the present invention, the packet network includes further means arranged in operation to reassign for any flow or group of flows the preference priorities or discard probability based on the result of one or more measurements and pre-determined thresholds related to any flow or group of flows, including means to revise the policed rate(s) of any flow or group of flows, said pre-determined thresholds being based on, but not limited to:

Flow rate or jitter in rate measured on any flow;

Flow rate or jitter in flow rate measured on any group of flows;

Flow count in any groups of flows;

Flow discard probability on the flow of the latest arriving packet;

Policy information on any groups of flows associated with the flow of the latest arriving packet;

Packet discard measurements on any group of flows;

Packet discard measurements on any flow;

Packet delay measurements on any flow or averaged on any group of flows;

Received signaling related to any flow, or received signaling related to any group of flows.

According to this second aspect of the present invention the packet network includes:

Means to determine the choice of flows that should be discarded among flows whose discard priority is the highest among the remaining flows not already selected for discard.

Means to limit the flows that should be discarded based on a set of threshold values associated with any group of flows against which is compared measured value(s) of packet rate, byte rate or the jitter in a rate as applied to the aggregate traffic in that said group of flows.

Counting means to determine how many flows have already been selected for discard in that said group of flows.

Means to automatically select for discard the latest flow that has started with a given discard probability.

Means to automatically select a group of flows for discard where the group of flows all have a given discard probability.

Means to de-select a flow that had been selected for discard when the said threshold values are compared against the said measured value(s) of a said group of flows or of a flow, together with means to determine that the latest measured value(s) exceed only a lower threshold than when the comparison was last performed prior to this latest said comparison.

Means to de-select a flow for discard based upon a time interval having elapsed during which time it had been selected for discard.

According to a third aspect of the embodiments of the present invention, a packet network node including a packet communications source comprising:

means arranged in operation to generate signaling packets after the determination that a change in capacity should be requested on any aggregate.

means to generate information and send a signaling packet according to:

Means that indicate any change of capacity associated with any aggregate;

Means that indicate changes to policing rates or measurement thresholds relating to any flow or any aggregate.

Using the said methods and means, a packet subnet operator is able to temporarily concentrate the adverse effects of congestion on selected communications, whilst improving, where possible, the capacity available to the congested aggregate, with the following advantages:

the quality of service afforded to a communication increases in inverse proportion to its discard probability.

flows with high discard probability are supported with minimum disturbance, especially when additional capacity can be added when required.

This in turn has the advantage of being less annoying to users receiving communications because flows are not rejected when traffic conditions determine that new flows cannot be supported with a low discard probability and flows with a high discard probability are managed to minimize any disturbance in the received QoS.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

Figure 1:
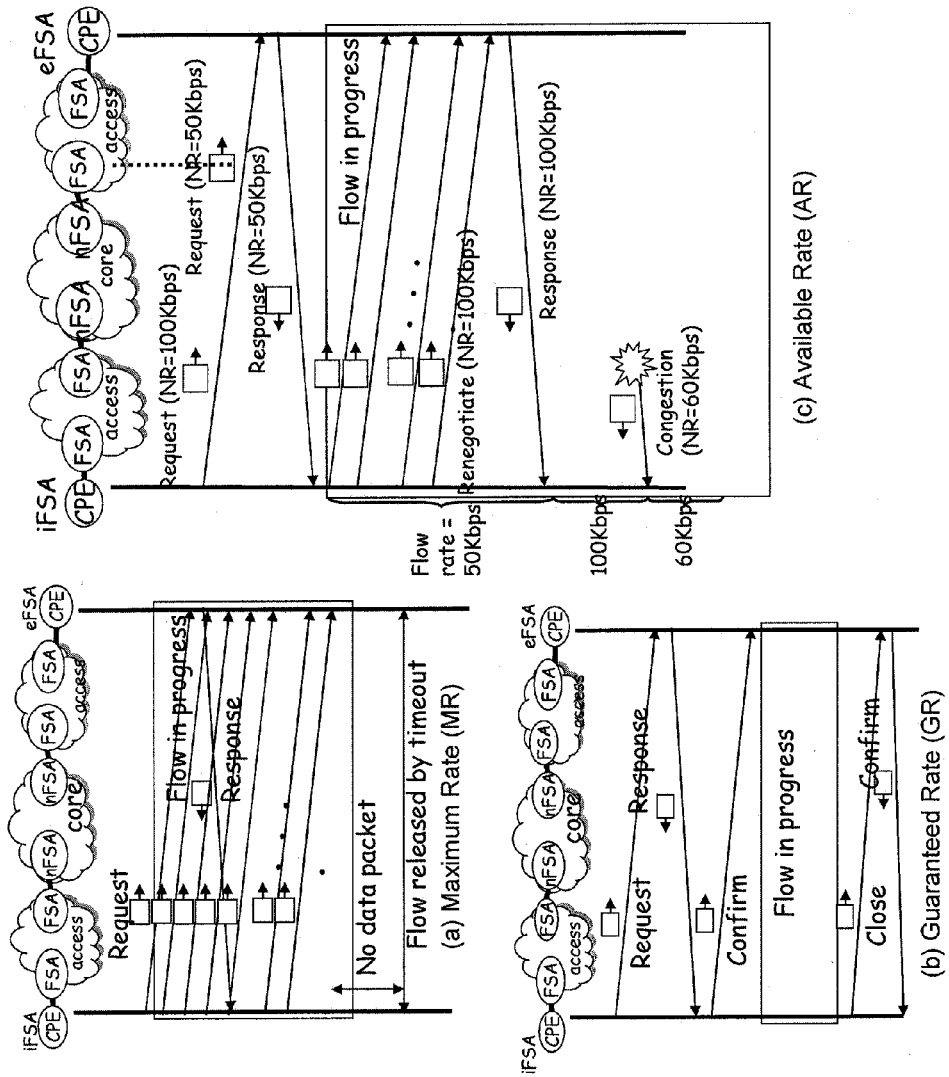
FIG. 1 illustrates the conventional configuration relating to in-band only FSA signaling.
Figure 2:
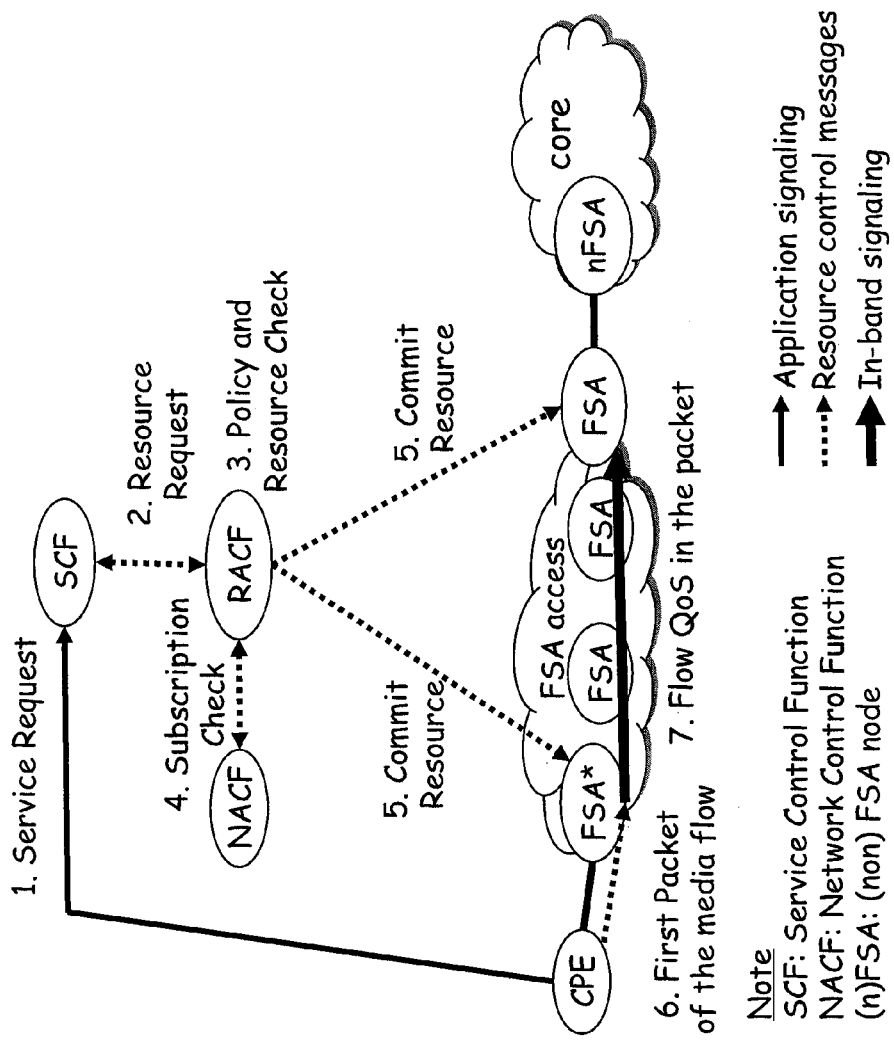
FIG. 2 illustrates alternative conventional configuration relating to a combination of in-band FSA signaling and out-of-band signaling.
Figure 3:
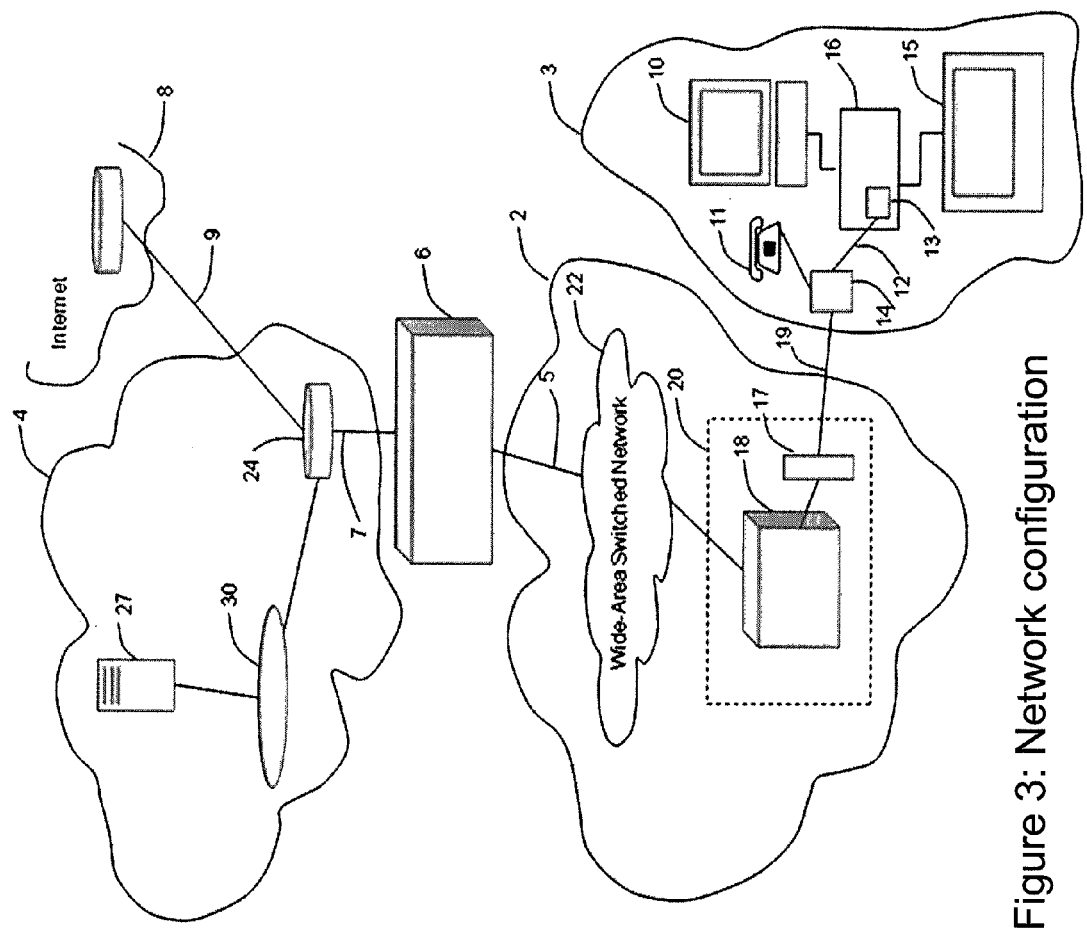
FIG. 3 illustrates the high-level network configuration for the realization of flow-based services

An internetwork (FIG. 3) comprises a user's home network 3, whereas component 2 of FIG. 3 is either an IP routed network or an ATM network or an Ethernet network or layer 1 cross-connection, such as SDH. In FIG. 3 is also a pair of copper wires 19 connecting the user's home network 3 to network 2, an Internet Service Provider's (ISP's) local area network 4, a flow-based QoS manager 6, a network link 5 that represents capacity that the ISP uses to deliver multiple flows to (or receive from) multiple end user networks 3. The ISP network link 7 would represent the input packets into the flow-based QoS manager 6 for flows travelling downstream from the ISP's network 4. The ISP's local area network 4 is connected to the Internet 8 via an Internet link 9.

The network 2 comprises exchange-housed equipment (17,18) housed in the local telephone exchange building 20 and a wide-area network 22 which connects a plurality of such DSLAMs 18 (there is normally one or more DSLAMs per exchange building, only one exchange building is shown in the drawing) towards the flow-based QoS manager 6. As will be understood by those skilled in the art, the exchange-housed equipment includes a Digital Subscriber Line Access Multiplexer (DSLAM) 18 shared between many users and, for each pair of copper wires 19, a splitter unit 17 which terminates the pairs of copper wires 19. The splitter unit 17 is effective to send signals within the frequency range used for normal telephony to the Public Switched Telephone Network (not shown) and to send signals in higher frequency bands to the DSLAM 18.

The user's home network may comprise a PC 10, a digital television 15, a splitter unit 14, a router/set-top box 16 which incorporates an Asymmetric Digital Subscriber Line (ADSL) modem 13, a cable 12 interconnecting the modem 13 and the splitter unit 14, and cables connecting the router 16 to the PC 10 and the digital television 15. The splitter unit 14 is effective to send signals within the frequency range used for normal telephony to the user's telephone 11 and to send signals in higher frequency bands to the ADSL modem 13. The ADSL modem 13 represents the network termination point of network 2.

The ISP's network 4 comprises an IP router 24, a content provider's video server 27, and a Local Area Network 30 which interconnects them. The previously mentioned Internet link 9 is connected to the IP router 24.

Broadband services typically utilize Ethernet as the layer 2 protocol. Again, typically in such a case, the DSLAM terminates the ATM if PPoA is used over the copper pair, and the DSLAM encapsulates the PPP payload in Ethernet for forwarding to the function 6. Link 5 is the aggregate capacity between function 6 and the DSLAMs and it is further subdivided into separate VLANs with either dedicated capacity per DSLAM or capacity that can be borrowed but is pre-emptively available when traffic conditions require the full capacity that can be available towards or from any one DSLAM.

Two other connection products 5 are based on the IP layer and routing across an MPLS platform.

In these cases, the PPPoE connections will terminate on a BRAS function within network 22. The two options are:

Using L2TP between the BRAS (acting as the LAC) and the ISP LNS router or direct to the service provider for them to provide the HG functions L2TP LNS (L2TP pass through) etc.

Create per service provider IP VPN's

Figure 4:
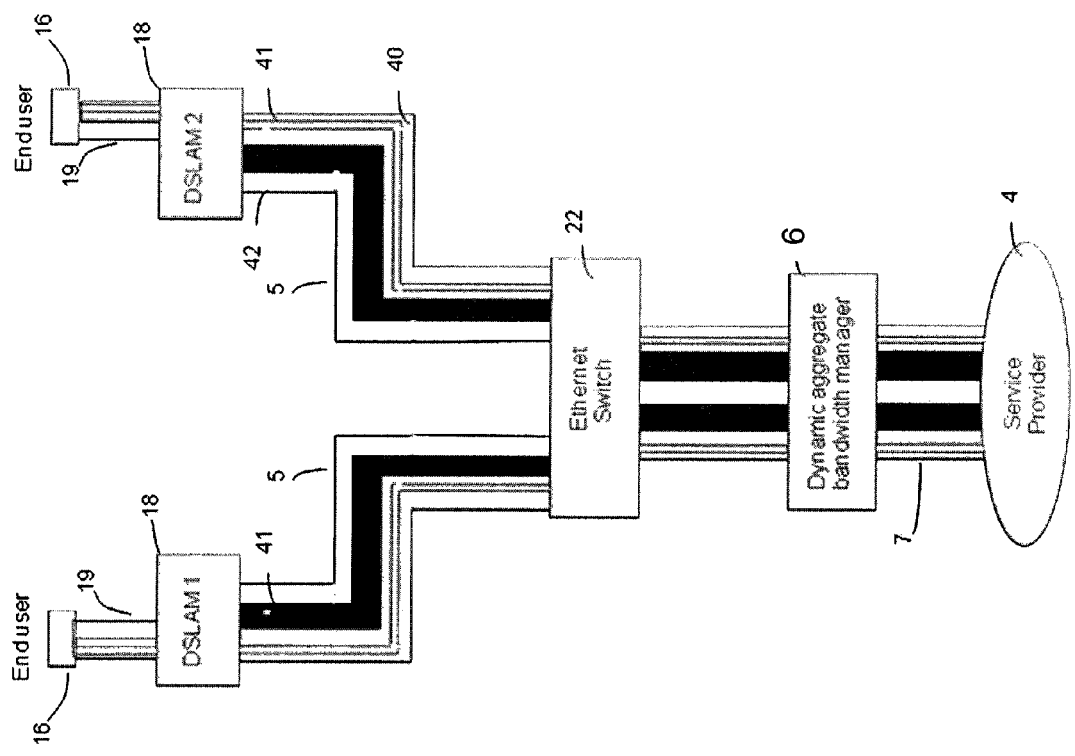
FIG. 4 illustrates an example deployment of a dynamic aggregate bandwidth manager and FSA QoS manager, labeled in the figure as function 6.

FIG. 4 shows an example deployment of function 6 where it is used to manage the flows that are grouped into separate VLANs, for example 40 and 41. Each VLAN delivers packets towards different DSLAMS 18 and on, from there, to broadband end-users 16. Typically, each VLAN may have dynamically-controlled rate-limits which the aggregate traffic must not exceed and these limits may include rate jitter limits that occur due to packet clustering.

In FIG. 4 there are no switching functions to be performed. In this configuration, the function 6 could be owned and deployed by a Service Provider, acting as an edge FSA shaper function and aggregate bandwidth manager for VLANs that the Service Providers uses and exclusively owns, where such VLANs share a common route. In the example of FIG. 4 the function 6, if owned by a Service Provider, supports service delivery over an Ethernet VLAN-structured fibre bandwidth connection from the Network Provider, enabling the Service Provider to maintain their own FSA QoS services and Intelligent Packet services towards or from a DSLAM 18 (or base station) and, ultimately via copper (or wireless) to a number of end-users. Alternatively, in this configuration of FIG. 4, the function 6 is a Network Provider function enabling QoS services and Intelligent Packet Services that can be offered to Service Providers.

Function 6 shapes the aggregate traffic of a specific VLAN according to the given maximum current rate allowable, and given current burst tolerance allowable. It also shapes the aggregate traffic towards each end user, again according to the current maximum rate allowable and given current burst tolerance allowable. In each case, it applies FSA QoS principles to incidents of congestion or incidents of excessive burstiness with respect to the individual flows that make up any particular aggregate traffic.

Figure 5:
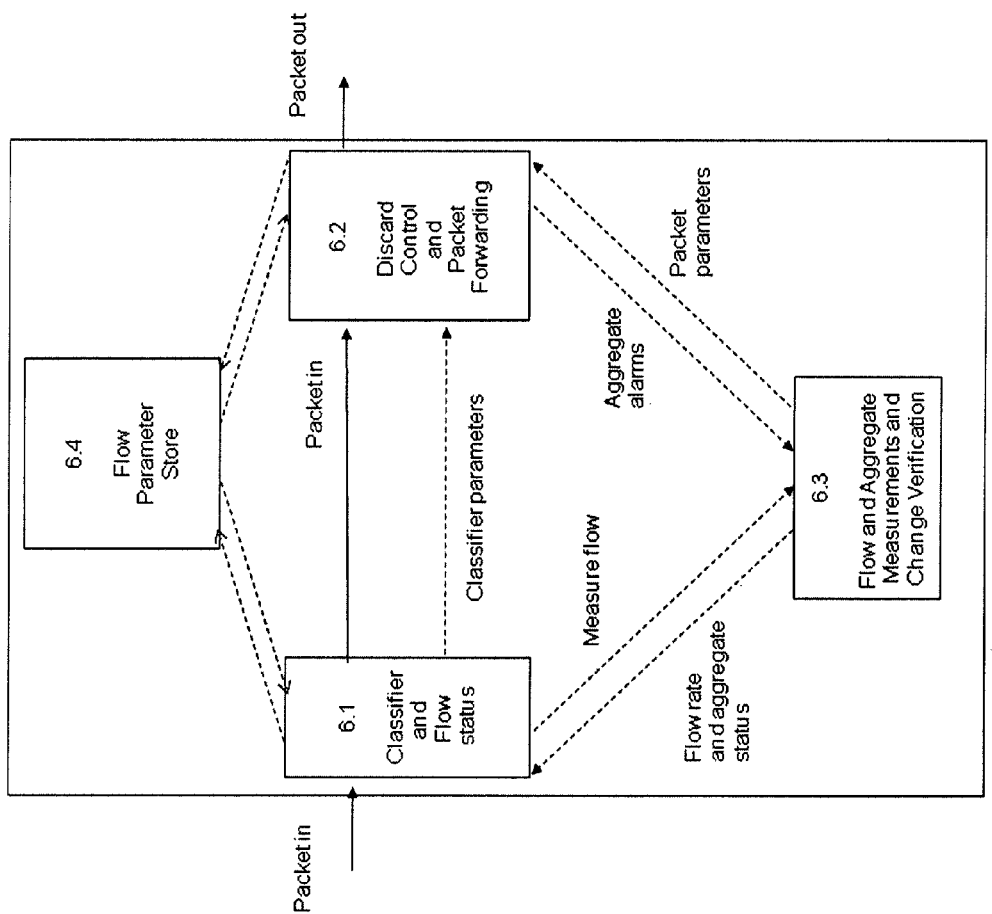
FIG. 5 illustrates an expansion of the function 6 supporting flow state aware QoS management, measurements, aggregate alerts and alarms, and dynamic adjustment of aggregate bandwidth.

FIG. 5 relates to the first preferred embodiment and shows an expansion of the function 6, containing sub-function 6.1 to 6.4. The classifier and flow status function 6.1 uses packet header information to generate a flow identity and uses this plus additional information, including a VLAN value, or a measured rate, to look up the QoS treatment of the flow and whether the flow has just started or whether the packet is a continuation of a previously-started flow. The results of this look up are recorded as components of the flow status of the flow and are stored in function 6.4.

The Discard Control and Packet Forwarding function 6.2 is the main QoS logic which receives inputs from 6.1 and the Flow and Aggregate Measurements and Change Verification function 6.3. Using these inputs, function 6.2 operates to determine if the latest arriving packet should be deleted or forwarded.

According to one embodiment, the method which function 6.3 uses to assist function 6.2 to determine a decision on whether to forward a packet or deleting it are:

Flows may vary in rate without any discard actions unless some aggregate, to which the flow belongs, is experiencing some congestion.

Congestion is determined by function 6.3 to be the excess jitter in the arrival rate of the aggregate byte flow on any one aggregate that is being monitored for such jitter conditions.

Function 6.3 may use different thresholds for each aggregate to compare against measured values of the excess jitter and may use the results of this comparison to do the following:

1. To indicate to function 6.2 different levels of congestion that have been reached on an aggregate, so that function 6.2 can choose the appropriate number of flows for packet discard actions and, for example select the lowest priority flows first.

2. At any level of congestion, or at a threshold level below the first level that would cause a congestion indication to be sent to function 6.2, the function 6.3 determines whether an increase in bandwidth can be obtained on the aggregate. Or, where congestion levels are falling, or has reached a lowest threshold level below any level that would cause function 6.2 to apply any packet deletion to any arriving packet of that aggregate, to determine whether a decrease in bandwidth is appropriate for the aggregate.

When such a congestion condition is notified by function 6.3.1 (see FIG. 7) towards function 6.2.2 (see FIG. 6), some flows are chosen for immediate discard.

In one embodiment, the choice of flows may be random from the lowest priority flows but with a pre-determined limit on the number of flows that can be chosen.

In another, preferred, embodiment, the initial choice of flows includes the last flow(s) that started that are low priority.

This initial group of flows is supplemented by further flows selected for discard if function 6.3.1 indicates to function 6.2.2 that congestion has risen to a greater level on an aggregate, as determined by comparison with the said congestion thresholds for that aggregate.

In one embodiment, when any level of congestion is detected by function 6.3.3, function 6.3.1 reduces the capacity available to the entire aggregate of flows that are contained in the congested aggregate and are classified as "best effort" flows. For example, aggregate 41 towards DSLAM2 in FIG. 4 is contained within aggregate 40 going towards DSLAM2. In this case the aggregate 41 going towards DSLAM2 illustrates a best effort aggregate and would be reduced in capacity if aggregate 40 going towards DSLAM2 became congested. This implies that the aggregate rate and rate jitter of the best effort aggregate will be policed against a reduced available rate and 6.3.1 will send indications to 6.2.2 when congestion is detected on the best effort aggregate.

In a preferred embodiment, when function 6.2.2 receives an indication from 6.3.1 that a best effort aggregate is congested, it marks the entire best effort aggregate as subject to temporary discard of all arriving best effort packets until function 6.3.1 further indicates to function 6.2.2 that congestion has ceased on the said congested best effort aggregate.

The function 6.2.1 (see FIG. 6) then begins to delete packets which belong to the flows or flow aggregates that have been selected. This deletion process continues until function 6.3.1 indicates that congestion is diminishing and that lower thresholds have been reached, or that congestion has ceased. When a lower threshold is reached, function 6.2.2 removes some of the flows designated for discard.

In one embodiment the choice of flows that are de-selected for discard is random among the flows that are designated for discard.

In another embodiment the choice of flows is based on the priority of the flow, with the highest priority being the most preferred for de-selection.

In another embodiment, the choice of flows is based on the time of starting of flows, with the oldest flow being the most preferred for de-selection.

In every case above, one preferred embodiment is that sufficient flows are de-selected until a pre-determined number of flows still remain as selected, according to the congestion level. Finally, when congestion disappears, as indicated by function 6.3.1 towards 6.2.2, all flows are de-selected.

In a preferred embodiment, when congestion is decreasing on an aggregate, function 6.3.1 will not release any part of the bandwidth that has been assigned to the aggregate until a lowest threshold level has been reached on measured rate or rate jitter for that aggregate, where this lowest level is below any threshold that would cause function 6.2.1 to be deleting packets of some flows or flow aggregates.

Figure 6:
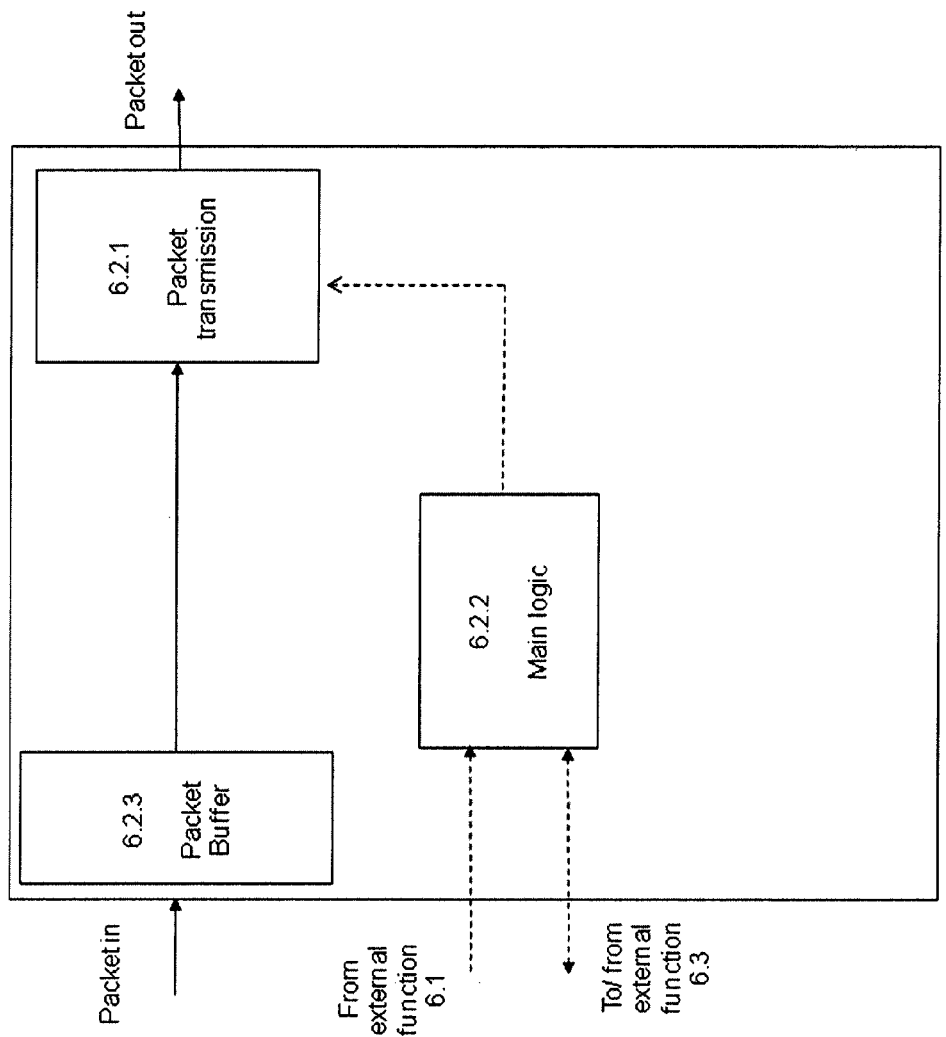
FIG. 6 illustrates an expansion of the functions of the Discard Control and Packet Forwarding function 6.2 according to one embodiment of the present invention.

FIG. 6 is an expansion of function 6.2, showing the packet transmission function 6.2.1, the main logic 6.2.2, and a packet buffer 6.2.3. As will be understood by those skilled in the art buffer 6.2.3 operates as a store for packets which are to be sent along connection 5. The buffer comprises an area within an electronic memory. The size of the buffer 6.2.3 is based on the following considerations:

In one embodiment the buffer may be removed and the operation becomes buffer-less. The output packet rate is determined from the input rate less any packets that are deleted, according to any rate and rate jitter requirements of aggregate flows.

In another embodiment, the buffer is required to manage the logic processing more effectively. Several packets may be admitted to the buffer and deletion and transmission actions performed on all of them at an appropriate point in the process cycle time.

The functions of the main logic 6.2.2 are to receive indications from function 6.3.1 and perform flow selection actions for packet discards to be performed as already described. Similarly the deletion actions of 6.2.1, responsive to the flow selection actions of 6.2.2, have already been described above. If packets are not deleted they are transmitted by function 6.2.1 from the buffer 6.2.3 to the output link 5.

Figure 7:
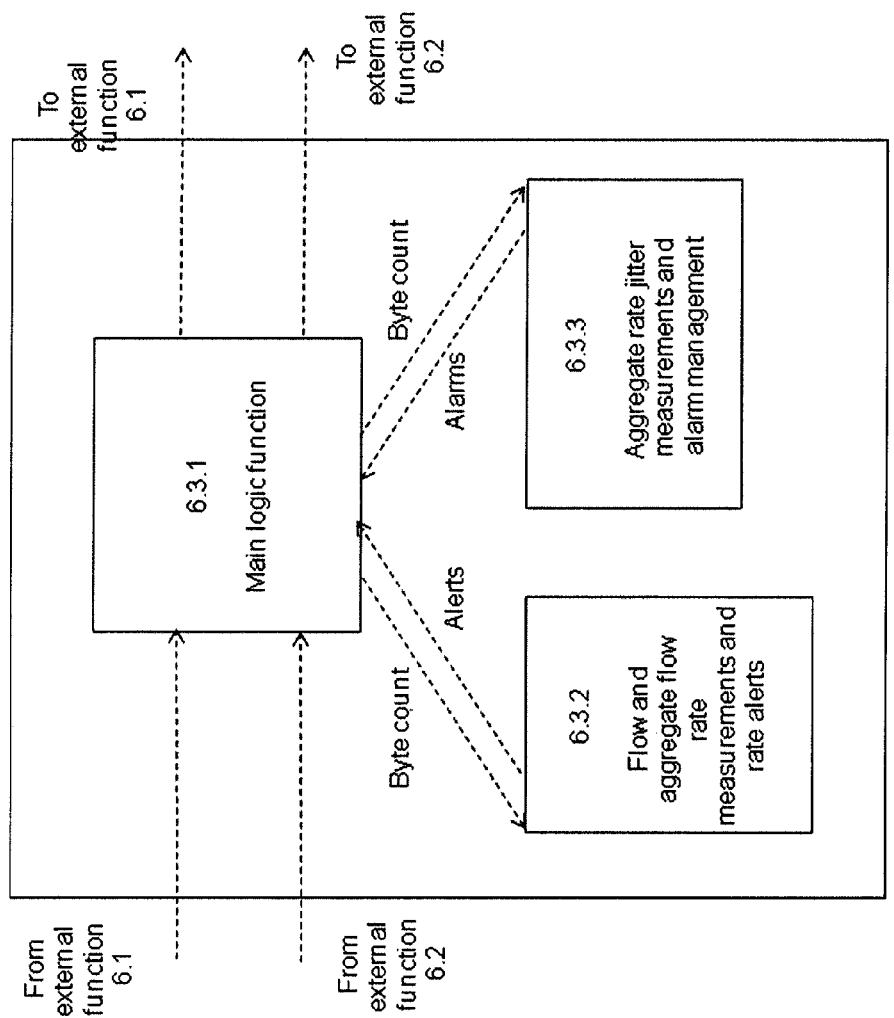
FIG. 7 illustrates an expansion of the functions of the Flow and Aggregate Measurements, and Change Verification function 6.3 according to one embodiment of the present invention.

FIG. 7 is an expansion of function 6.3, showing the main logic function 6.3.1, the flow and aggregate flow rate measurements and rate alerts function 6.3.2, and the aggregate rate jitter measurements and alarm management 6.3.3. The function 6.3.3 has been partly described above, in terms of its actions detecting congestion and informing function 6.2 (via function 6.3.1) of congestion alarms and state changes in these alarms. To determine these alarms, function 6.3.3 operates as follows:

In a preferred embodiment, when a packet arrives, its byte count is indicated by function 6.1 to 6.3.3. An amount of tokens equal to this byte count are then placed in a set of "token buckets" (one bucket per aggregate, choosing aggregates which this flow belongs to, where the flow id is determined from the arriving packet). Each token bucket is drained of tokens at a certain pre-defined constant rate that is equivalent to the capacity available to that given aggregate. Alarms correspond to the depth of the bucket (i.e. the quantity of tokens in the bucket, not yet drained away, compared to a set of threshold values. When the quantity of tokens equals or exceeds a threshold value, an alarm is raised. When the quantity of tokens subsequently reduces below that same threshold, the alarm-level is reduced to the next lower level (if any) or the alarm is ceased (if there are no lower levels).

In another embodiment, the token bucket may be replaced by a more approximate method that is simpler to calculate. A rate is measured over a short interval determined by a starting point when a packet arrives and a finishing point when another packet arrives, both belonging to the same aggregate. The number of packets used to define the interval length may be chosen at will, with care used to ensure that it is not too long so that very short term rate variations will be missed, and not too short so that local clusters of packets, of acceptable size, are not mistaken for an unacceptable local rate. Thresholds are used to indicate alarms based on the local measured rate equaling or exceeding one of several pre-determined thresholds.

The function 6.3.2 measures rates on individual flows and on aggregates. For aggregates, it also compares the measured rate against one or more pre-determined thresholds and indicates an alert to function 6.1 when the aggregate rate is equal to or exceeding one of these thresholds. It also measures the flow rate of a flow. In a preferred embodiment it will include an initial measurement of the flow rate for a sufficiently short interval of time that allows the classifier to be quickly updated about this information and potentially change the classification given to that flow. Again, care must be used so that the interval is sufficiently short, yet long enough so that short-term variations in the local rate, due to packet clustering, are not confused with the average rate of the flow.

The main logic function 6.3.1 acts to receive indications from other functions 6.1 and 6.2 and to schedule tasks in functions 6.3.2 and 6.3.3 and to receive the outputs of these tasks and format them into output indications towards 6.1 and 6.2.

Figure 8:
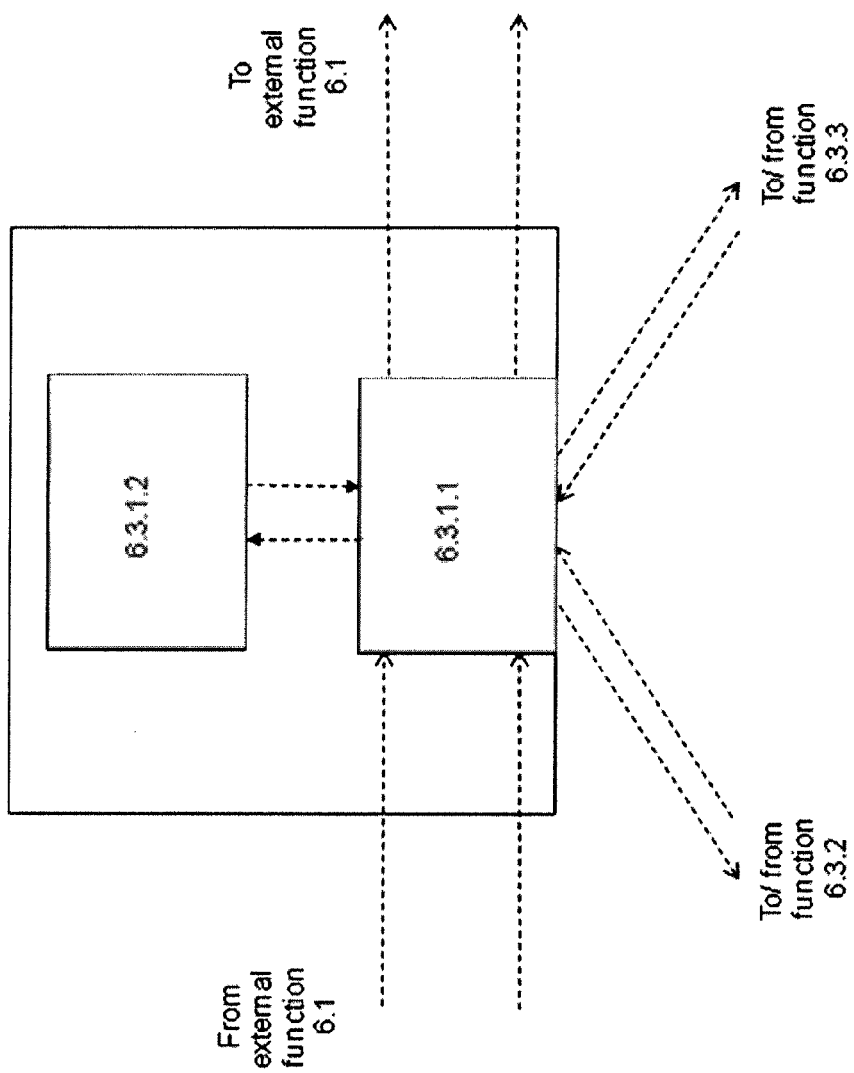
FIG. 8 illustrates another embodiment, including a signal generator function 6.5 that can send signals to a remote Change Verification function 6.3.1 or receive signals from such a function 6.3.1 and forward such signals to a co-located function 6.3 for management of aggregate rate changes.

Function 6.3.1 also includes a sub-function termed the Verification Function 6.3.1.2 (see FIG. 8). In another embodiment, function 6.3.1.2 is located remotely operating as an Application Program running on a Server and interacting with other components of function 6.3 through an Application Program Interface (see FIG. 9).

Function 6.3.1.1 is informed by 6.3.3 that congestion thresholds have been reached on an aggregate, either because congestion is increasing or decreasing. The function 6.3.1.1 sends an indication to either a co-located function 6.3.1.2 (FIG. 8) or a remote function 6.3.1.2 (FIG. 9) informing it of the aggregate identity and indicating the threshold congestion level. The function 6.3.1.2 retrieves policy information related to the aggregate and the donor aggregates that may be used to add more bandwidth to the congested aggregate or give back bandwidth from the aggregate when congestion has lowered sufficiently.

Policy decisions on the addition and subtraction of bandwidth may be varied to suit customer needs including, but not limited to, the following:

Bandwidth is not subtracted from an aggregate until the measured bit rate of the traffic of that aggregate has fallen to a given threshold.

Bandwidth is not subtracted from an aggregate until there have been no further congestion notifications from that aggregate for a pre-defined interval of time.

Bandwidth is never subtracted from some aggregates, bandwidth additions being permanent additions.

Bandwidth that is subtracted from an aggregate may be all or part of a measurement of added bandwidth that the aggregate has received over a specified interval of time.

Subtracted bandwidth is re-assigned to donor aggregates in a priority order including, but not limited to the following:

Giving bandwidth back to the donor re-assignable unused capacity only after all other donor aggregates have received back specified amounts of bandwidth.

Giving back specified amounts of bandwidth in any pre-assigned sequence that includes all donor aggregates and the donor re-assignable unused bandwidth, whether or not a donor aggregate or the donor re-assignable unused bandwidth gave bandwidth to the aggregate.

Subtracted bandwidth is assigned randomly to any one or more donor aggregates and the donor re-assignable unused bandwidth.

Added bandwidth is assigned using a combination of donor aggregates and the donor re-assignable unused bandwidth in a preferred and specified sequence order, subject to defined limits for the amount of capacity that can be added set for each such donor and specific to the requesting aggregate.

Defined limits for the amount of capacity that can be added from a donor aggregate may be calculated based on either static unchanging values, or dynamic values based on the current traffic that the donor is carrying or the frequency which the donor is experiencing congestion.

Capacity may be added on a temporary basis above limits set for that aggregate on the basis that such added temporary capacity will be removed when other aggregates require it where such aggregates are below the limits set for capacity that may be added. In such a case the aggregate with added temporary capacity becomes a new donor aggregate with respect to other aggregates that are entitled to have added capacity. It remains in the state of donor until all the temporary added capacity is removed.

Added bandwidth is assigned using a combination of donor aggregates and the donor re-assignable unused bandwidth so that the choice of donors is based on the amount of available capacity they have to donate including, but not limited to, selecting the first donor as the one with the largest amount of capacity available to donate and taking all this capacity and then, if necessary, selecting the donor with the next largest capacity and continuing in this way until the limit of what can be added to this aggregate has been reached, where this limit on the total added capacity is specific to each aggregate.

Function 6.3.1.2 indicates to 6.3.3 and 6.3.2 any change in the rates or thresholds that should now be used as a result of a change of capacity, relating to that aggregate and the donor aggregates. Function 6.3.1.2 maintains the remaining unused capacity of any donor re-assignable unused capacity.

Thresholds will include any rate thresholds that should be increased or decreased based on the change of capacity Thresholds will include any rate jitter thresholds that should be changed, based on the change of capacity.

Figure 9:
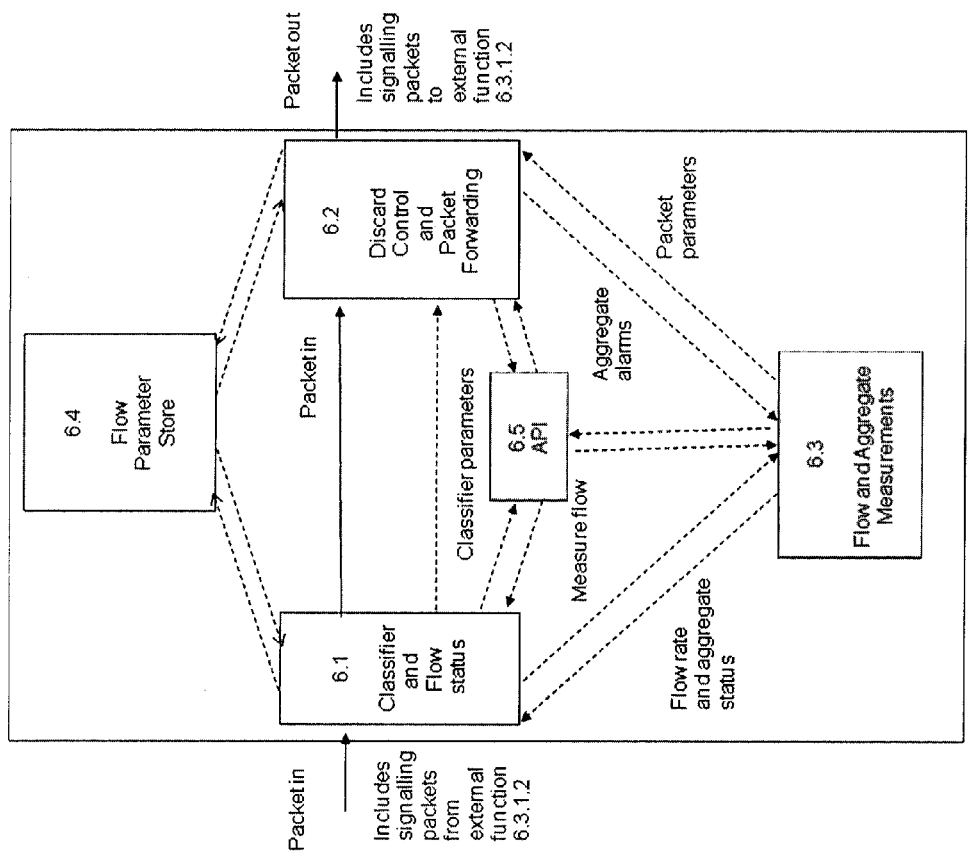
FIG. 9 illustrates another embodiment where arriving signaling packets are recognized by the classifier function 6.1 and are passed to function 6.5.

FIG. 9 shows another embodiment where arriving signaling packets are recognized by the classifier function 6.1 and are passed to function 6.5. In turn, function 6.5 can inform function 6.3 of signals received that relate to an external Verification Function. Similarly, function 6.3.1.1 will indicate to function 6.5 the requirement to pass on an indication to an external function 6.3.1.2 using signaling packets that are passed back to function 6.1 for onward transmission.

Figure 10:
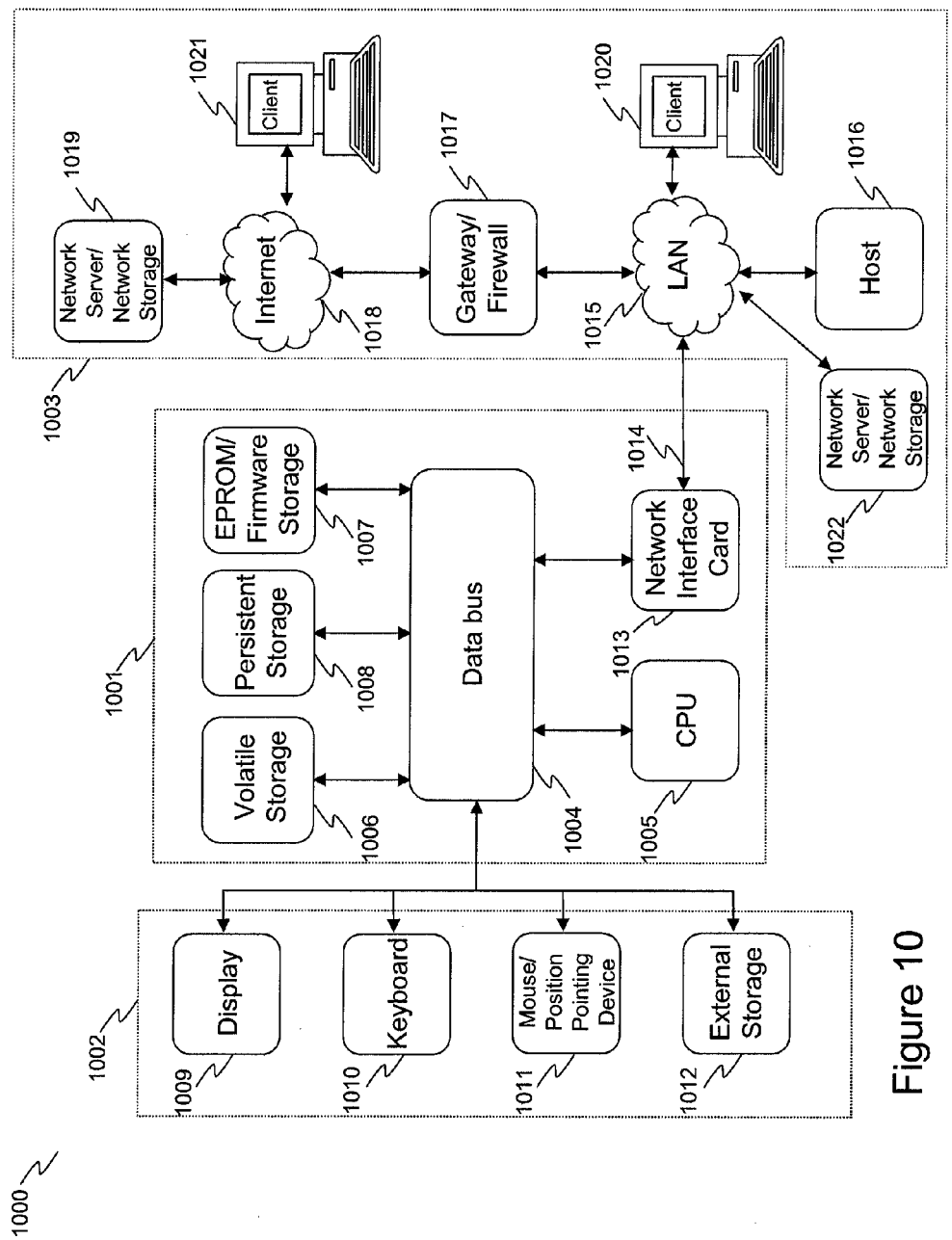
FIG. 10 illustrates an exemplary embodiment of a hardware platform upon which the present invention may be implemented.

FIG. 10 illustrates an exemplary embodiment of a computer platform upon which the inventive system may be implemented.

FIG. 10 is a block diagram that illustrates an embodiment of a computer/server system 1000 upon which an embodiment of the inventive methodology may be implemented. The system 1000 includes a computer/server platform 1001, peripheral devices 1002 and network resources 1003.

The computer platform 1001 may include a data bus 1005 or other communication mechanism for communicating information across and among various parts of the computer platform 1001, and a processor 1005 coupled with bus 1001 for processing information and performing other computational and control tasks. Computer platform 1001 also includes a volatile storage 1006, such as a random access memory (RAM) or other dynamic storage device, coupled to bus 1005 for storing various information as well as instructions to be executed by processor 1005. The volatile storage 1006 also may be used for storing temporary variables or other intermediate information during execution of instructions by processor 1005. Computer platform 1001 may further include a read only memory (ROM or EPROM) 1007 or other static storage device coupled to bus 1005 for storing static information and instructions for processor 1005, such as basic input-output system (BIOS), as well as various system configuration parameters. A persistent storage device 1008, such as a magnetic disk, optical disk, or solid-state flash memory device is provided and coupled to bus 1001 for storing information and instructions.

Computer platform 1001 may be coupled via bus 1005 to a display 1009, such as a cathode ray tube (CRT), plasma display, or a liquid crystal display (LCD), for displaying information to a system administrator or user of the computer platform 1001. An input device 1010, including alphanumeric and other keys, is coupled to bus 1001 for communicating information and command selections to processor 1005. Another type of user input device is cursor control device 1011, such as a mouse, a trackball, or cursor direction keys for communicating direction information and command selections to processor 1005 and for controlling cursor movement on display 1009. This input device typically has two degrees of freedom in two axes, a first axis (e.g., x) and a second axis (e.g., y), that allows the device to specify positions in a plane.

An external storage device 1012 may be coupled to the computer platform 1001 via bus 1005 to provide an extra or removable storage capacity for the computer platform 1001. In an embodiment of the computer system 1000, the external removable storage device 1012 may be used to facilitate exchange of data with other computer systems.

The invention is related to the use of computer system 1000 for implementing the techniques described herein. In an embodiment, the inventive system may reside on a machine such as computer platform 1001. According to one embodiment of the invention, the techniques described herein are performed by computer system 1000 in response to processor 1005 executing one or more sequences of one or more instructions contained in the volatile memory 1006. Such instructions may be read into volatile memory 1006 from another computer-readable medium, such as persistent storage device 1008. Execution of the sequences of instructions contained in the volatile memory 1006 causes processor 1005 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1005 for execution. The computer-readable medium is just one example of a machine-readable medium, which may carry instructions for implementing any of the methods and/or techniques described herein. Such a medium may take many forms, including but not limited to, non-volatile media and volatile media. Non-volatile media includes, for example, optical or magnetic disks, such as storage device 1008. Volatile media includes dynamic memory, such as volatile storage 1006.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, or any other medium from which a computer can read.

Various forms of computer readable media may be involved in carrying one or more sequences of one or more instructions to processor 1005 for execution. For example, the instructions may initially be carried on a magnetic disk from a remote computer. Alternatively, a remote computer can load the instructions into its dynamic memory and send the instructions over a telephone line using a modem. A modem local to computer system can receive the data on the telephone line and use an infra-red transmitter to convert the data to an infra-red signal. An infra-red detector can receive the data carried in the infra-red signal and appropriate circuitry can place the data on the data bus 1005. The bus 1005 carries the data to the volatile storage 1006, from which processor 1005 retrieves and executes the instructions. The instructions received by the volatile memory 1006 may optionally be stored on persistent storage device 1008 either before or after execution by processor 1005. The instructions may also be downloaded into the computer platform 1001 via Internet using a variety of network data communication protocols well known in the art.

The computer platform 1001 also includes a communication interface, such as network interface card 1013 coupled to the data bus 1005. Communication interface 1013 provides a two-way data communication coupling to a network link 1015 that is coupled to a local network 1015. For example, communication interface 1013 may be an integrated services digital network (ISDN) card or a modem to provide a data communication connection to a corresponding type of telephone line. As another example, communication interface 1013 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 1013 sends and receives electrical, electromagnetic or optical signals that carry digital data streams representing various types of information.

Network link 1013 typically provides data communication through one or more networks to other network resources. For example, network link 1015 may provide a connection through local network 1015 to a host computer 1016, or a network storage/server 1017. Additionally or alternatively, the network link 1013 may connect through gateway/firewall 1017 to the wide-area or global network 1018, such as an Internet. Thus, the computer platform 1001 can access network resources located anywhere on the Internet 1018, such as a remote network storage/server 1019. On the other hand, the computer platform 1001 may also be accessed by clients located anywhere on the local area network 1015 and/or the Internet 1018. The network clients 1020 and 1021 may themselves be implemented based on the computer platform similar to the platform 1001.

Local network 1015 and the Internet 1018 both use electrical, electromagnetic or optical signals that carry digital data streams. The signals through the various networks and the signals on network link 1015 and through communication interface 1013, which carry the digital data to and from computer platform 1001, are exemplary forms of carrier waves transporting the information.

Computer platform 1001 can send messages and receive data, including program code, through the variety of network(s) including Internet 1018 and LAN 1015, network link 1015 and communication interface 1013. In the Internet example, when the system 1001 acts as a network server, it might transmit a requested code or data for an application program running on client(s) 1020 and/or 1021 through Internet 1018, gateway/firewall 1017, local area network 1015 and communication interface 1013. Similarly, it may receive code from other network resources.

The received code may be executed by processor 1005 as it is received, and/or stored in persistent or volatile storage devices 1008 and 1006, respectively, or other non-volatile storage for later execution.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in the communications network and a methods of operating of a communications network. It is intended that the specification and examples be considered as exemplary only, with a true scope and spirit of the invention being indicated by the following claims.

What is claimed is:

1. A method of operating a packet subnetwork comprising:
   a. partitioning of one or more physical links into a number of aggregates, where each aggregate is assigned an amount of capacity and one or several aggregates are assigned to one or more donor aggregates co-existing on the same said link or links as the said assigned aggregates, so that any one of the said aggregates may increase its capacity by borrowing capacity from one or more of its said donor aggregates, or may decrease its capacity by giving back capacity to one or more of the said donor aggregates;
   b. receiving one or more communication packets indicative of the commencement of a packet communication through said subnet, said packet communication comprising a flow consisting of a plurality of packets;
   c. responsive to recognition of the commencement of a new packet flow, storing a flow identifier, enabling identification of packets belonging to said commenced packet communication flow and associating that flow identifier with one or more of the said aggregates, including or excluding the said donor aggregates;
   d. responsive to recognition of the commencement of said new flow, retrieving policy information relating to any initial or sustained QoS treatment of the flow, wherein such policy information is derived from:
      i. packet header information at any level of encapsulation;
      ii. signaling information related to that flow identity;
      iii. policy attributes associated with the physical link on which the packet arrived or will depart;
      iv. measured rates applying to the flow rate of the said flow, or the measured jitter in flow rate; and
      v. measured rates applying to the total traffic on one or more of the said aggregates which the said new flow is associated with, or the measured jitter in such said rates, e. responsive to recognition of the commencement of said new flow, and to retrieved policy information, determining an initial or sustained discard probability from:
  vi. the associated stored policy information corresponding to the said new flow; and
  vii. packet counters, byte counters, or rate counters of any aggregate group of flows to which this flow belongs that are being monitored with respect to one or more traffic load criteria,
f. responsive to said policy determination, and QoS treatment determination, related to flow identity, retrieving said policy determination and QoS treatment determination associated with the flow of the latest arriving packet, and determining if one or several pre-determined thresholds or limits have been reached, or will be reached if the latest arriving packet is transmitted, that provide indications of a change in the capacity requirements of aggregates associated with the flow of this said latest arriving packet, said pre-determined thresholds being based on at least:
  viii. flow rate or jitter in rate measured on any flow;
  ix. flow rate or jitter in flow rate measured on any aggregate;
  x. Flow count in any aggregates;
  xi. Flow discard probability on the flow of the latest arriving packet;
  xii. Policy information on any aggregates associated with the flow of the latest arriving packet;
  xiii. Packet discard measurements on any aggregate;
  xiv. Packet discard measurements on any flow;
  xv. Packet delay measurements on any flow or averaged on any aggregate; and
  xvi. Received signaling related to any flow, or received signaling related to any aggregate,
g. responsive to said determination that one or more pre-determined thresholds or limits have been reached on said aggregate associated with the flow of the latest arriving packet, causing an indication to be observable that an increase or decrease in capacity is required for that aggregate and a corresponding decrease or increase of capacity is required of one or more donor aggregates associated with that aggregate; and
h. enabling immediate transfer of said latest arriving packet subject only to said determination of the discard probability associated with the flow identity of said packet.

2. A method according to claim 1, wherein said pre-determined limits or thresholds indicative of a change in bandwidth requirement on one or more aggregates associated with the flow identity of the said latest arriving packet comprise:
  a. measurements of rates or jitter in rates associated with a group of flows which may or may not include said flow of the latest arriving packet, and where this said group of flows is a subset of all the active flows of one or more of said aggregates associated with said flow identity of said latest arriving packet; and
  b. a preference priority associated with the flow identity of said latest arriving packet, derived by said policy determination and said QoS treatment determination or through said signaling received about the said flow.

3. A method according to claim 1, wherein said observable indication that a change in aggregate capacity is required on one or more aggregates includes the sending of an indication towards a verification function that determines if said indicated change in capacity can be permitted or modified.

4. A method according to claim 3, wherein said verification function optionally reduces the capacity of a donor aggregate by sending an indication towards a policing function that lowers the policing thresholds on rate or rate jitter of said donor aggregate such that, when said lowered policing thresholds are determined to be exceeded by measurement of the latest and recent arriving packets of the total traffic of said donor aggregate, a number of packets are discarded instead of being transmitted so that the remaining transmitted packets do not exceed the lowered policing rates.

5. A method according to claim 3, wherein said verification function, having observed said indication for an increase in capacity on an aggregate, optionally determines for this said aggregate which donor aggregates associated with said aggregate shall be decreased in capacity and by what amount of capacity.

6. A method according to claim 1, wherein a donor aggregate has no flows and its capacity is an unused pool of capacity usable to increase the capacity of other aggregates and its capacity is increased by the release of capacity from other aggregates.

7. A method according to claim 3, wherein said unused pool of capacity is shared among several other flow aggregates and said verification function controls the sharing of its pool of capacity such that:
  a. said verification function allows temporary use of any spare capacity in the unused capacity pool for any aggregate indicating that an increase in capacity is required on the basis of temporary or unguaranteed assignments above a pre-determined share of said pool of capacity; and
  b. said verification function decreases said temporary use of spare capacity when other aggregates require an increase in capacity and one or more aggregates are currently using more than a pre-determined share of the pool of capacity, such that no aggregate is decreased in capacity below its said pre-determined share unless it indicates that a further decrease is required,
wherein a donor aggregate has no flows and its capacity is an unused pool of capacity usable to increase the capacity of other aggregates and its capacity is increased by the release of capacity from other aggregates.

8. A method according to claim 7, wherein said determination of an initial or sustained discard probability associated with a flow identity includes the assignment of a larger discard probability when, for any aggregate associated with said flow identity, being an aggregate that has a portion of its capacity assigned on the basis of said temporary assignment of capacity, the measured rate of that aggregate is greater than one or more threshold rates based on the said pre-determined share of capacity available to that aggregate.

9. A method according to claim 3, wherein said unused pool of capacity is shared among several other flow aggregates and said verification function controls the sharing of its pool of capacity such that:
  c. said verification function allows guaranteed assignments of additional capacity for any aggregate indicating that an increase in capacity is required on the basis of guaranteed assignments up to a pre-determined share of the said pool of capacity; and
  d. said verification function decreases capacity of any aggregate requiring guaranteed assignments of capacity:
    i. under normal operating conditions the said aggregate requiring guaranteed assignments of capacity indicates to the verification function that a decrease in capacity should be effected; or
    ii. under abnormal operating conditions where current levels of guaranteed capacity cannot be sustained,
wherein a donor aggregate has no flows and its capacity is an unused pool of capacity usable to increase the capacity of other aggregates and its capacity is increased by the release of capacity from other aggregates.

10. A method according to claim 8, wherein, when a packet arrives whose flow is associated with an aggregate, where congestion has ceased or where traffic levels on an aggregate have fallen below some threshold indicative of the onset of congestion, or when measurements relating to any rate-based, byte count-based, or packet-count based threshold shows that measured levels are now below level(s) that had previously exceeded one or more such thresholds, then retrieving policy relating to such a change of status of this aggregate and relating to re-grading of the discard probability of the said flow, given that measured levels have fallen or congestion has disappeared.

11. A packet network node comprising:
   a. an input for receiving one or more packets;
   b. means arranged to measure a packet rate or byte rate in said packet network node, relating to any flow or group of flows, and means to detect an excessive packet rate or byte rate, including use of associated limits of rate or rate jitter assigned to such a flow or group of flows;
   c. means arranged to re-assign capacity and associated rate limits or rate jitter limits between either of the following:
      i. one group of flows and one or more other donor groups of flows that have a common route and share capacity, or have a partition of the capacity, of a link or a number of consecutive links over which the first said group is routed; or
      ii. one group of flows and a combination of additional other said donor groups of flows (if any) and unused re-assignable capacity (donor re-assignable unused capacity) on a shared common route that said first group, said donor groups (if any) and said donor re-assignable capacity share,
   d. means arranged to detect excessive packet bursts or jitter in the packet or byte rate in said packet network node relating to any flow or group of flows including the use of associated limits of burstiness or jitter assigned to the flow or group of flows;
   e. means arranged to retrieve policy determination and QoS treatment determination associated with the flow of the latest arriving packet, and means arranged in operation to determine if one or several pre-determined thresholds or limits have been reached, or will be reached if the latest arriving packet is transmitted, that provide indications of a change in the capacity requirements of groups of flows associated with the flow of this said latest arriving packet, said pre-determined thresholds being based on at least:
   iii. flow rate or jitter in rate measured on any flow;
   iv. flow rate or jitter in flow rate measured on any group of flows;
   v. flow count in any groups of flows;
   vi. flow discard probability on the flow of the latest arriving packet;
   vii. policy information on any groups of flows associated with the flow of the latest arriving packet;
   viii. packet discard measurements on any group of flows;
   ix. packet discard measurements on any flow;
   x. packet delay measurements on any flow or averaged on any group of flows; and
   xi. received signaling related to any flow, or received signaling related to any group of flows.

12. The packet network node according to claim 11, further comprising means arranged to provide an observable indication of a requirement for a capacity reassignment to any group of flows, which is either:
   a. an observable indication that an increase in capacity is required for a group of flows and a corresponding decrease of capacity is required of zero or more said donor groups and zero or more said donor re-assignable capacity associated with that first said group; or
   b. an observable indication that an decrease in capacity is required for a group of flows and a corresponding increase of capacity is required of zero or more said donor groups and zero or more said donor re-assignable capacity associated with that first said group.

13. The packet network node according to claim 11, further comprising means arranged to provide a communication identifier store for storing a set of communication identifiers and associated state information.

14. The packet network node according to claim 11, further comprising means arranged in operation to reduce or increase the discard probability associated with a flow and its related communication identifier from said communication identifier store when one or more predetermined conditions are met associated with measurements in any aggregate to which the flow belongs.

15. The packet network node according to claim 11, further comprising means arranged in operation to identify one or more flows that should be discarded when the packet rate, byte rate or the jitter of a rate in any group of flows determine that such a deletion is required.

16. The packet network node according to claim 11, further comprising means arranged, on the detection that a packet rate, byte rate or the jitter of a rate in any group of flows is equal to or has exceeded a pre-determined threshold, to identify arriving packets associated with one of said communication identifiers stored in said communication identifier store; and forward packets associated with any flow identifier unless the discard probability associated with that flow identifier is set so that all packets are to be temporarily discarded.

17. The packet network node according to claim 11, further comprising means arranged in operation to reassign for any flow or group of flows the preference priorities or discard probability based on the result of one or more measurements and pre-determined thresholds related to any flow or group of flows, including means to revise the policed rate(s) of any flow or group of flows, said pre-determined thresholds being based on at least:
   a. flow rate or jitter in rate measured on any flow;
   b. flow rate or jitter in flow rate measured on any group of flows;
   c. flow count in any groups of flows;
   d. flow discard probability on the flow of the latest arriving packet;
   e. policy information on any groups of flows associated with the flow of the latest arriving packet;
   f. packet discard measurements on any group of flows;
   g. packet discard measurements on any flow;
   h. packet delay measurements on any flow or averaged on any group of flows; and
   i. received signaling related to any flow, or received signaling related to any group of flows.

18. The packet network node according to claim 16, wherein the identification means of flows that should be discarded comprises:
   a. means to determine the choice of flows that should be discarded among flows whose discard priority is the highest among the remaining flows not already selected for discard;
   b. means to limit the flows that should be discarded based on a set of threshold values associated with any group of flows against which is compared measured value(s) of packet rate, byte rate or the jitter in a rate as applied to the aggregate traffic in that said group of flows;
c. counting means to determine how many flows have already been selected for discard in that said group of flows;
d. means to automatically select for discard the latest flow that has started with a given discard probability;
e. means to automatically select a group of flows for discard where the group of flows all have a given discard probability;
f. means to de-select a flow that had been selected for discard when the said threshold values are compared against the said measured value(s) of a said group of flows or of a flow, together with means to determine that the latest measured value(s) exceed only a lower threshold than when the comparison was last performed prior to this latest said comparison; and
g. means to de-select a flow for discard based upon a time interval having elapsed during which time it had been selected for discard.

* * * * *